*US011972322B2*

United States Patent
Gaebler et al.

(10) Patent No.: US 11,972,322 B2
(45) Date of Patent: Apr. 30, 2024

(54) DECREASED CROSSTALK ATOMIC OBJECT DETECTION

(71) Applicant: Quantinuum LLC, Broomfield, CO (US)

(72) Inventors: John Gaebler, Golden, CO (US); Brian Neyenhuis, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 390 days.

(21) Appl. No.: 17/393,011

(22) Filed: Aug. 3, 2021

(65) Prior Publication Data

US 2022/0108202 A1 Apr. 7, 2022

Related U.S. Application Data

(60) Provisional application No. 63/088,064, filed on Oct. 6, 2020.

(51) Int. Cl.
*G06N 10/00* (2022.01)
*H04B 10/70* (2013.01)

(52) U.S. Cl.
CPC ............. *G06N 10/00* (2019.01); *H04B 10/70* (2013.01)

(58) Field of Classification Search
CPC ................................. G06N 10/00; H04B 10/70
See application file for complete search history.

(56) References Cited

PUBLICATIONS

Bruzewicz Colin D. et al: "Trapped-ion quantum computing: Progress and challenges", Applied Physics Reviews, vol. 6, No. 2, Apr. 8, 2019 (Apr. 8, 2019), p. 021314, XP055798038, DOI: 10.1063/1.5088164 Retrieved from the Internet: URL:https://arxiv.org/pdf/1904.04178.pdf.

Extended European search report dated Mar. 4, 2022 for EP Application No. 21200367, 12 page.

Leibfried D: "Individual addressing and state readout of trapped ions utilizing rf-micromotion", arxiv.org, Cornell University Library, 201 Olin Library Cornell University Ithaca, NY 14853, Dec. 15, 1998 (Dec. 15, 1998), XP080648693.

Leibfried, D., "Individual addressing and state readout of trapped ions utilizing rf-micromotion", submitted Dec. 15, 1998, Physical Review A, [online, article] retreived from the Internet at <https://arxiv.org/pdf/quant-ph/9812033.pdf> on Feb. 10, 2022, 8 pages.

*Primary Examiner* — Nicole M Ippolito
*Assistant Examiner* — Hanway Chang
(74) *Attorney, Agent, or Firm* — Alston & Bird LLP

(57) ABSTRACT

Various embodiments provide methods, apparatuses, systems, or computer program products for performing decreased crosstalk atomic object reading/detection. A controller is operatively connected to components of a system comprising a confinement apparatus comprising RF electrodes defining an RF null axis and a plurality of longitudinal electrodes. The components comprise voltage sources and manipulation sources. The controller is configured to cause an atomic object being read and neighboring atomic object(s) to be confined by the confinement apparatus; and cause the voltage sources to provide first control signals to longitudinal electrodes. The first control signals cause the longitudinal electrodes to generate a push field configured to cause one of the atomic object being read or the neighboring atomic object(s) to move off the RF null axis. The controller is further configured to cause a manipulation source to generate/provide a reading beam that is at least partly incident on the atomic object being read.

20 Claims, 9 Drawing Sheets

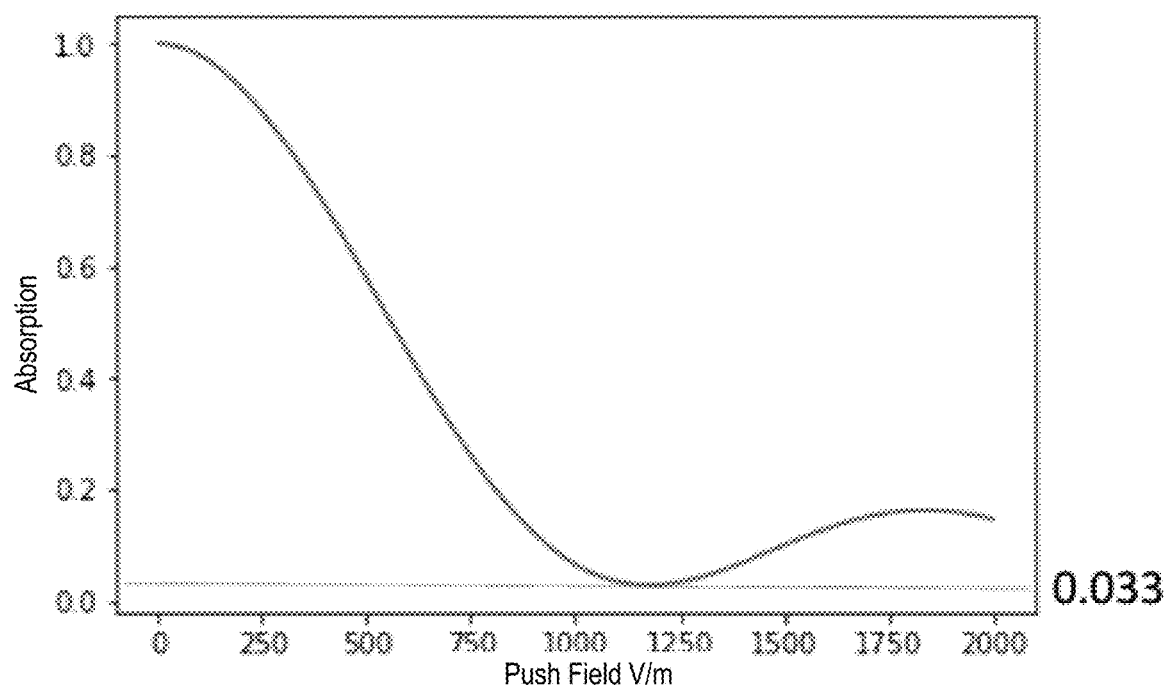
FIG. 6A
FIG. 6B
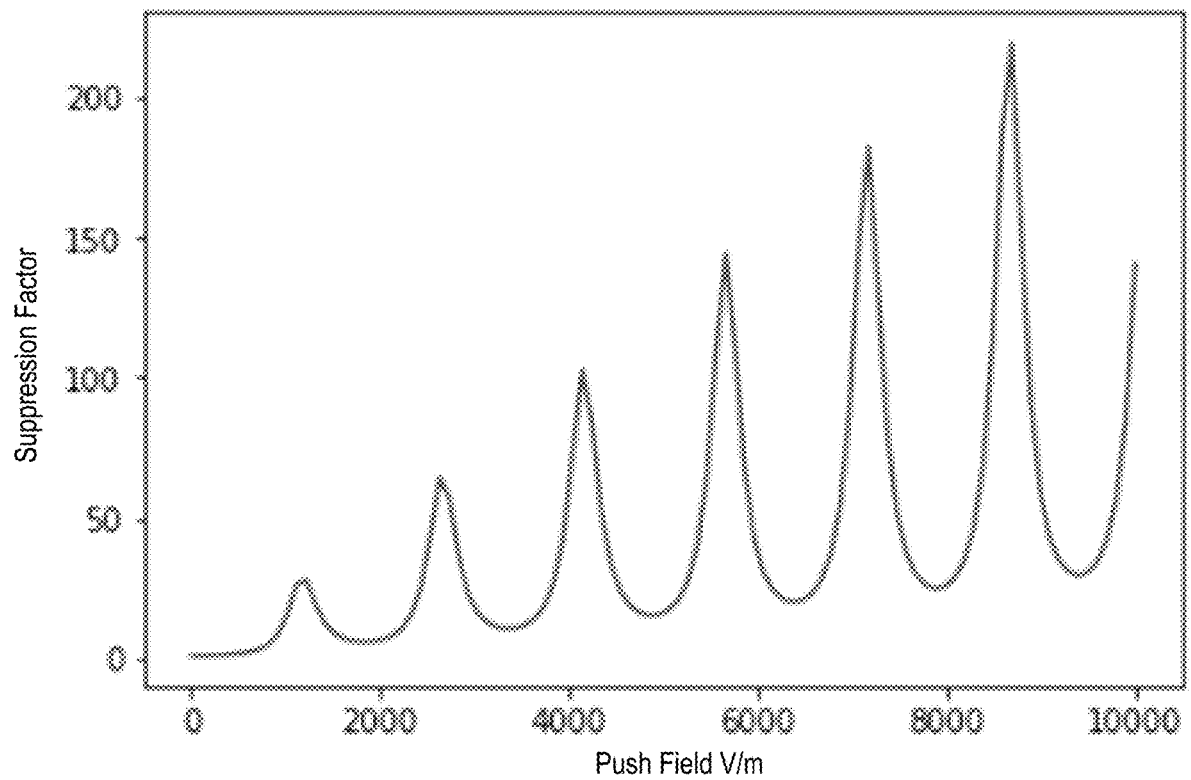

DECREASED CROSSTALK ATOMIC OBJECT DETECTION

CROSS-REFERENCE TO RELATED APPLICATIONS

This application claims priority to U.S. Application No. 63/088,064, filed Oct. 6, 2020, the content of which is hereby incorporated by reference in its entirety.

TECHNICAL FIELD

Various embodiments relate to apparatuses, systems, and methods relating to detecting and/or reading atomic objects within an atomic object confinement apparatus. For example, some example embodiments relate to the detection and/or reading of a qubit of a quantum computer.

BACKGROUND

Quantum computing is the use of quantum phenomena such as superposition and entanglement to perform computation. In particular, quantum bits (qubits) are acted on to cause and/or control evolution of quantum states of the qubits to perform one or more calculations. To determine the result of the one or more calculations, the quantum state of one or more of the qubits needs to be read and/or detected. However, crosstalk errors may occur when a qubit neighboring a qubit to be read and/or detected is decohered or otherwise disturbed during the reading and/or detecting of the qubit to be read and/or detected. Through applied effort, ingenuity, and innovation many deficiencies of such prior reading and/or detection techniques have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for reducing crosstalk during an atomic object reading and/or detection function. Various embodiments correspond to a quantum computer, such as a trapped atomic object quantum computer, for example, and performing qubit reading and/or detection functions in a manner that reduces and/or suppresses crosstalk errors. For example, the qubit of the quantum computer may be an atom and/or ion, which may be part of an atom and/or ion crystal and/or group. In various embodiments, the atomic object is trapped and/or confined within an atomic object confinement apparatus, such as an ion trap, a surface ion trap, and/or the like. The qubit may be read and/or detected by providing a reading beam (e.g., a laser beam that has a frequency/wavelength that is resonant with a particular quantum transition of the atomic object being used as the qubit) that is incident upon the qubit (e.g., atomic object) to be read. For example, when the qubit (e.g., atomic object) fluoresces in response to the reading beam being incident thereon, the qubit is in one state (e.g., state 1) and when the qubit (e.g., atomic object) does not fluoresce in response to the reading beam being incident thereon, the qubit is in another state (e.g., state 0). For example, the reading beam may be configured to stimulate emission of a particular frequency/wavelength by the qubit (e.g., atomic object) when the qubit is in a particular state and not stimulate emission of the particular frequency/wavelength if the qubit is not in the particular state.

However, photons from the reading beam and/or the stimulated emission emitted by the qubit being read and/or detected may be incident on neighboring qubits (e.g., atomic objects). As used herein, a neighboring qubit (e.g., atomic object) is a qubit (e.g. atomic object) that neighbors and/or is adjacent to the qubit to be read and/or detected and/or that is close enough to the qubit being read and/or detected that photons from the reading beam and/or the stimulated emission emitted by the qubit being read and/or detected (or another neighboring qubit) may be incident thereon. Various embodiments of the present disclosure relate to reducing crosstalk errors caused by neighboring qubits having incident thereon photons from the reading beam and/or the stimulated emission emitted by the qubit being read and/or detected (or another neighboring qubit). For example, in various embodiments, the absorption of photons from the reading beam and/or the stimulated emission emitted by the qubit being read and/or detected (or another neighboring qubit) by neighboring qubits is suppressed. In various embodiments, small amplitude oscillations are imparted to a neighboring qubit (e.g., atomic object) and/or the qubit (e.g., atomic object) being read and/or detected such that a photon having a frequency/wavelength resonant with the qubit being read and/or detected is off-resonance for any neighboring qubits.

According to a first aspect, a method for a decreased crosstalk atomic object reading and/or detection function is provided. In an example embodiment, the method comprises providing at least two atomic objects within a confinement apparatus. The at least two atomic objects comprise an atomic object being read and at least one neighboring atomic object. The confinement apparatus comprises (a) one or more radio frequency (RF) electrodes defining an RF null axis of the atomic object confinement apparatus and (b) a plurality of longitudinal electrodes. The method further comprises causing at least one voltage source to provide at least one first control signal to at least one longitudinal electrode of the plurality of longitudinal electrodes. The at least one first control signal causes the at least one longitudinal electrode to generate a push field configured to cause one of (a) the at least one neighboring atomic object to move in a direction transverse to the RF null axis at a location of the at least one neighboring atomic object or (b) the atomic object being read to move in a direction transverse to the RF null axis at a location of the atomic object being read. The method further comprises causing a manipulation source to generate and provide a reading beam that is incident at least in part on the atomic object being read.

In an example embodiment, the method further comprises beginning to execute a quantum circuit using the at least two atomic objects within the atomic object confinement apparatus; during the performance of the quantum circuit, identifying a read function to be performed, wherein the causing of the at least one first control signal to be provided to the at least one longitudinal electrode and the causing of the manipulation source to generate and provide the reading beam are performed responsive to identifying the read function to be performed; and continuing to execute the quantum circuit. In an example embodiment, the method further comprises receiving a read result responsive to the reading beam being incident at least in part on the atomic object being read; and adjusting the quantum circuit based at least in part on the read result such that the adjusted quantum circuit is executed. In an example embodiment, the method further comprises causing at least one second control signal to be provided to one or more longitudinal electrodes of the plurality of longitudinal electrodes, wherein the at least one second control signal causes the one or more longitudinal electrodes to generate an oscillating potential configured to cause the at least one neighboring atomic object to oscillate in a direction substantially parallel to a direction between the at least one neighboring atomic object and the atomic object being read.

In an example embodiment, the at least one first control signal is configured to cause the push field to increase monotonically to a maximum field strength and then decrease monotonically to a minimum field strength. In an example embodiment, the maximum field strength is in a range of 1050 to 1250 Volts per meter. In an example embodiment, as the field strength decreases from the maximum field strength to the minimum field strength, the at least one neighboring atomic object moves toward the RF null axis. In an example embodiment, when the one of (a) the at least one neighboring atomic object or (b) the atomic object being read is located off of the RF null axis, the one of (a) the at least one neighboring atomic object or (b) the atomic object being read exhibits oscillations in a direction transverse to the RF null axis at the location of the at least one neighboring atomic object. In an example embodiment, when the atomic object being read is located off of the RF null axis, a frequency of the reading beam is modulated so that in an oscillating reference frame of the atomic object being read, the frequency of the reading beam is on resonance for a particular transition of the atomic object being read. In an example embodiment, in a reference frame of the at least one neighboring atomic object, a frequency of the reading beam is off resonant with a particular transition of the at least one neighboring atomic object.

In an example embodiment, the method is performed by a controller of a system comprising the confinement apparatus, voltage sources, and manipulation sources. In an example embodiment, a processing device of the controller executes executable instructions stored by a memory of the controller to cause the controller to perform the method. In an example embodiment, the system is a quantum computer. In an example embodiment, the quantum computer is a trapped ion quantum computer and the confinement apparatus is an ion trap, such as a surface ion trap.

According to another aspect of the present disclosure, a controller is provided. The controller is operatively connected to one or more components of a system comprising a confinement apparatus. The confinement apparatus comprises (a) one or more radio frequency (RF) electrodes defining an RF null axis of the atomic object confinement apparatus and (b) a plurality of longitudinal electrodes. The one or more components of the system comprise (a) voltage sources and (b) manipulation sources. In an example embodiment, the controller is configured to cause at least two atomic objects to be confined within the confinement apparatus, the at least two atomic objects comprising an atomic object being read and at least one neighboring atomic object; and cause the voltage sources to provide at least one first control signal to at least one longitudinal electrode of the plurality of longitudinal electrodes. The at least one first control signal causes the at least one longitudinal electrode to generate a push field configured to cause one of (a) the at least one neighboring atomic object to move in a direction transverse to the RF null axis at a location of the at least one neighboring atomic object or (b) the atomic object being read to move in a direction transverse to the RF null axis at a location of the atomic object being read. The controller is further configured to cause a manipulation source to generate and provide a reading beam that is incident at least in part on the atomic object being read.

In an example embodiment, the controller is further configured to control the one or more components to cause a quantum circuit to begin to be performed using the at least two atomic objects within the atomic object confinement apparatus; during the performance of the quantum circuit, identify a read function to be performed, wherein the causing of the voltage sources to provide the at least one first control signal to the at least one longitudinal electrode and the causing of the manipulation source to generate and provide the reading beam are performed responsive to identifying the read function to be performed; and control the one or more components to cause the quantum circuit to continue to be performed. In an example embodiment, the controller is further configured to receive a read result responsive to the reading beam being incident at least in part on the atomic object being read; and adjust the quantum circuit based at least in part on the read result such that the adjusted quantum circuit is executed. In an example embodiment, the controller is further configured to cause the voltage sources to provide at least one second control signal to one or more longitudinal electrodes of the plurality of longitudinal electrodes, wherein the at least one second control signal causes the one or more longitudinal electrodes to generate an oscillating potential configured to cause the at least one neighboring atomic object to oscillate in a direction substantially parallel to a direction between the at least one neighboring atomic object and the atomic object being read.

In an example embodiment, the at least one first control signal is configured to cause the push field to increase monotonically to a maximum field strength and then decrease monotonically to a minimum field strength. In an example embodiment, the maximum field strength is in a range of 1050 to 1250 Volts per meter. In an example embodiment, as the field strength decreases from the maximum field strength to the minimum field strength, the at least one neighboring atomic object moves toward the RF null axis. In an example embodiment, when the one of (a) the at least one neighboring atomic object or (b) the atomic object being read is located off of the RF null axis, the one of (a) the at least one neighboring atomic object or (b) the atomic object being read exhibits oscillations in a direction transverse to the RF null axis. In an example embodiment, when the atomic object being read is located off of the RF null axis, the controller causes the manipulation source to modulate a frequency of the reading so that in an oscillating reference frame of the atomic object being read, the frequency of the reading beam is on resonance for a particular transition of the atomic object being read. In an example embodiment, in a reference frame of the at least one neighboring atomic object, a frequency of the reading beam is off resonant with a particular transition of the at least one neighboring atomic object.

In an example embodiment, the controller is part of the system comprising the confinement apparatus, voltage sources, and manipulation sources. In an example embodiment, a processing device of the controller executes executable instructions stored by a memory of the controller to cause the controller to control the voltage sources and manipulation sources to confine the at least two atomic objects in the confinement apparatus via a confinement potential, provide the at least one first control signal to the at least one longitudinal electrode, and generate and provide the reading beam. In an example embodiment, the system is a quantum computer. In an example embodiment, the quantum computer is a trapped ion quantum computer and the confinement apparatus is an ion trap, such as a surface ion trap. In an example embodiment, a filter configured to filter frequencies greater than a cut-off frequency from being provided to a longitudinal electrode is configured to pass the second control signal to the longitudinal electrode, wherein the second control signal has a frequency that is greater than the cut-off frequency.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
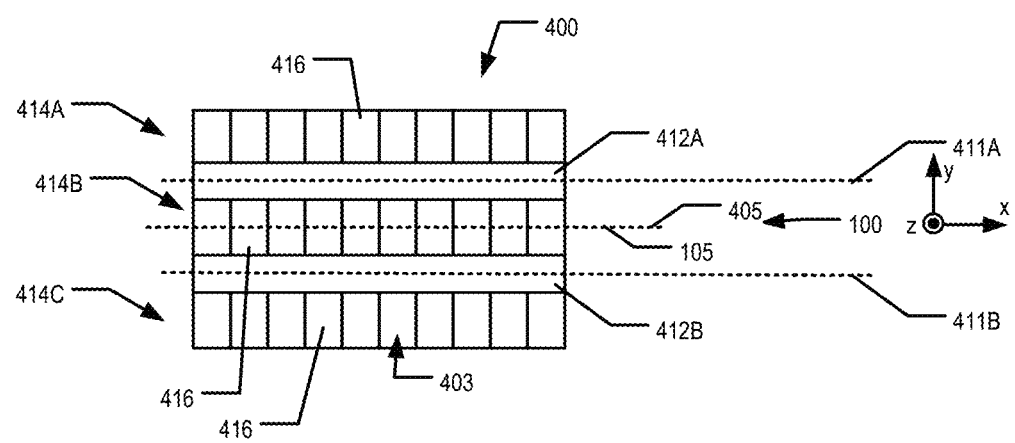

FIG. 4 provides a top view of an example atomic object confinement apparatus that may be used in example embodiment.

Figure 5:
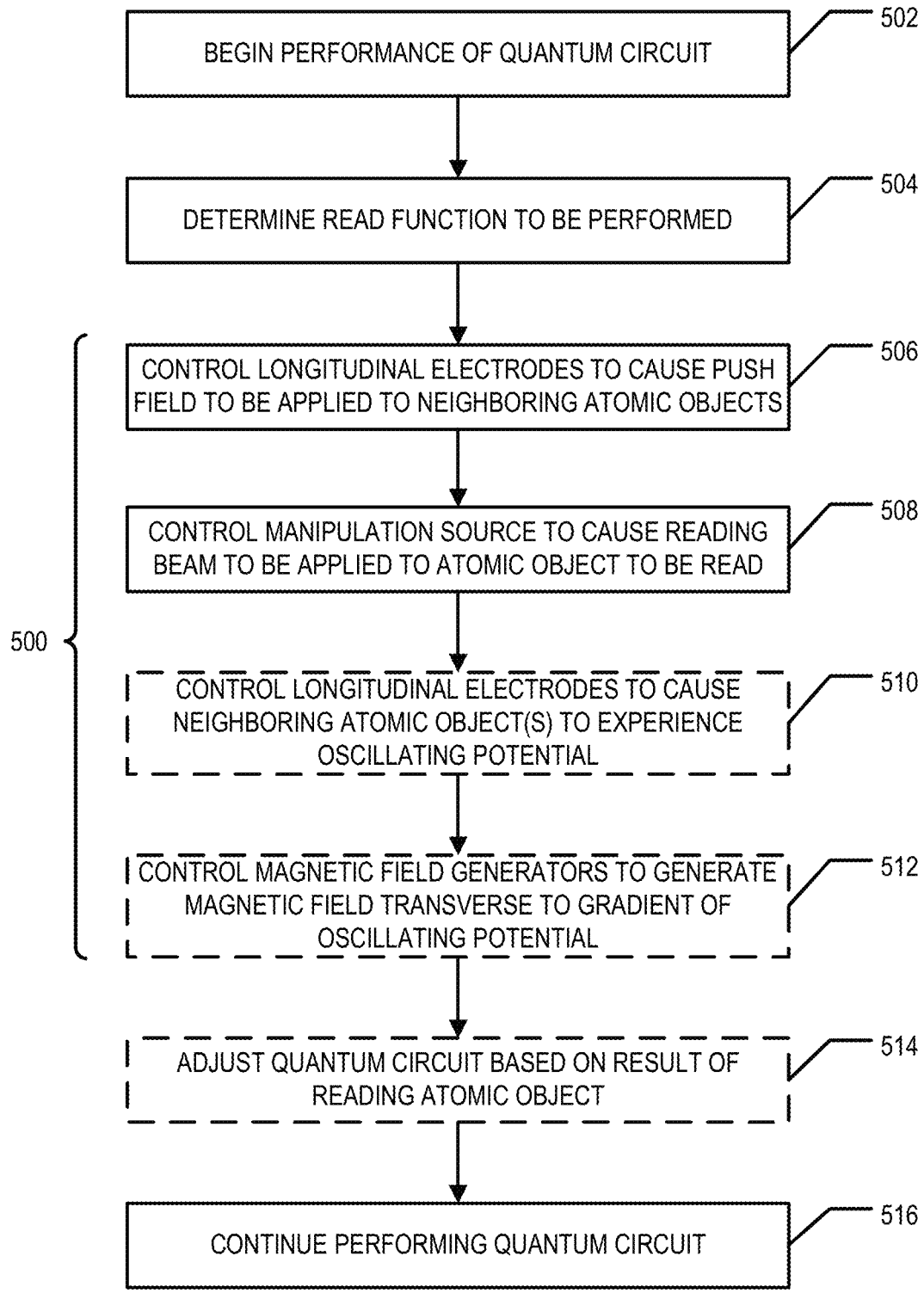

FIG. 5 is a flowchart of various processes, procedures, and/or operations that may be performed, for example, by a controller of the atomic object confinement apparatus, to perform a decreased crosstalk reading and/or detection function, in accordance with an example embodiment.

FIGS. 6A and 6B provide plots showing the effect of the field strength of a push field that may be applied to a neighboring qubit (e.g., atomic object) and/or a qubit being read and/or detect, according to some example embodiments.

Figure 7:
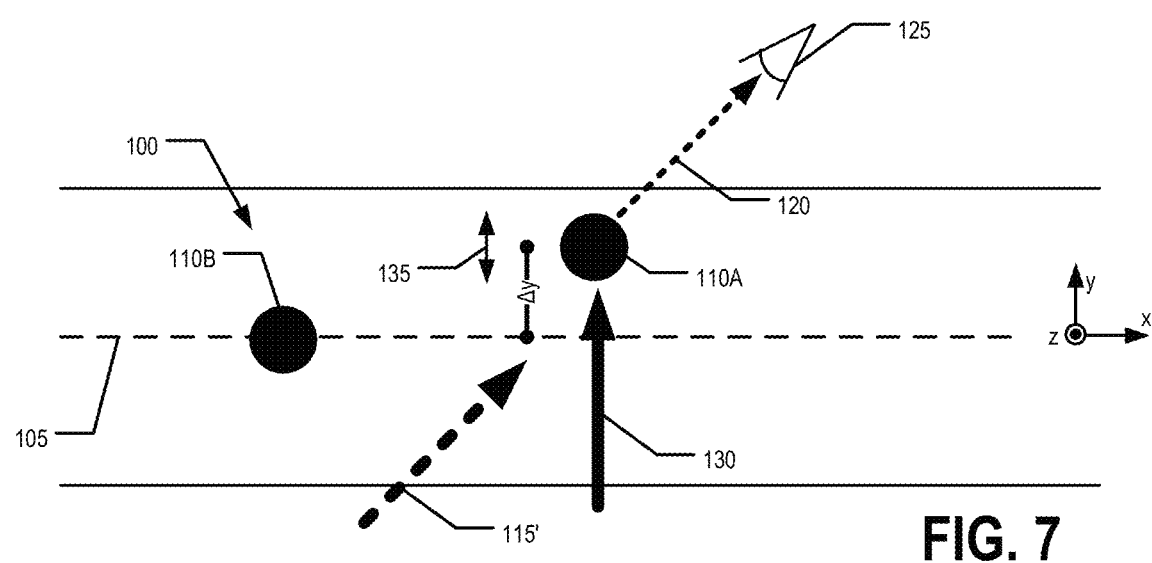

FIG. 7 is a schematic diagram of another decreased crosstalk reading and/or detection function in accordance with an example embodiment.

Figure 8:
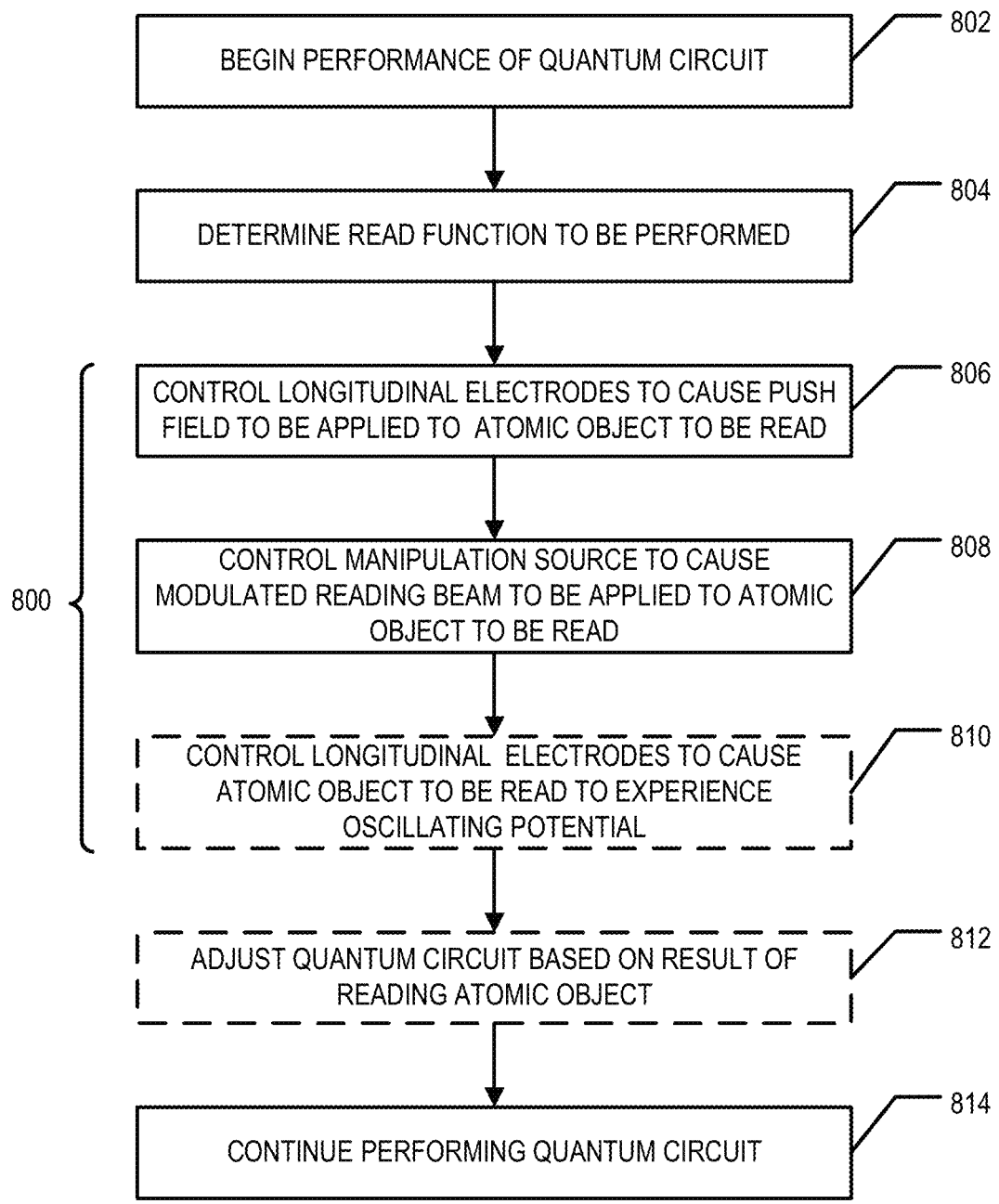

FIG. 8 is a flowchart of various processes, procedures, and/or operations that may be performed, for example, by a controller of the atomic object confinement apparatus, to perform a decreased crosstalk reading and/or detection function, in accordance with an example embodiment.

Figure 9:
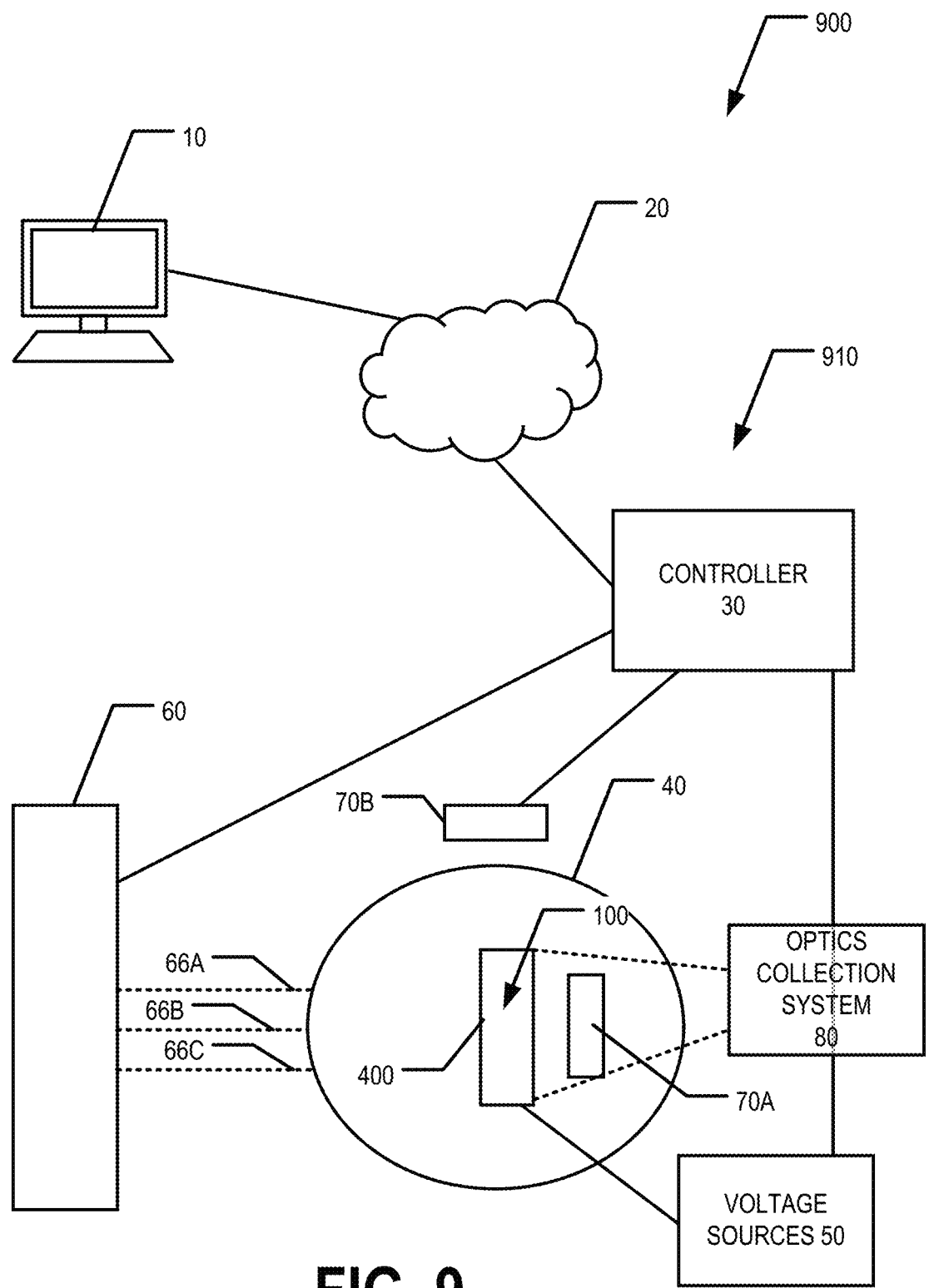

FIG. 9 is a schematic diagram illustrating an example quantum computing system configured to perform one or more decreased crosstalk reading and/or detection functions, according to various embodiments.

Figure 10:
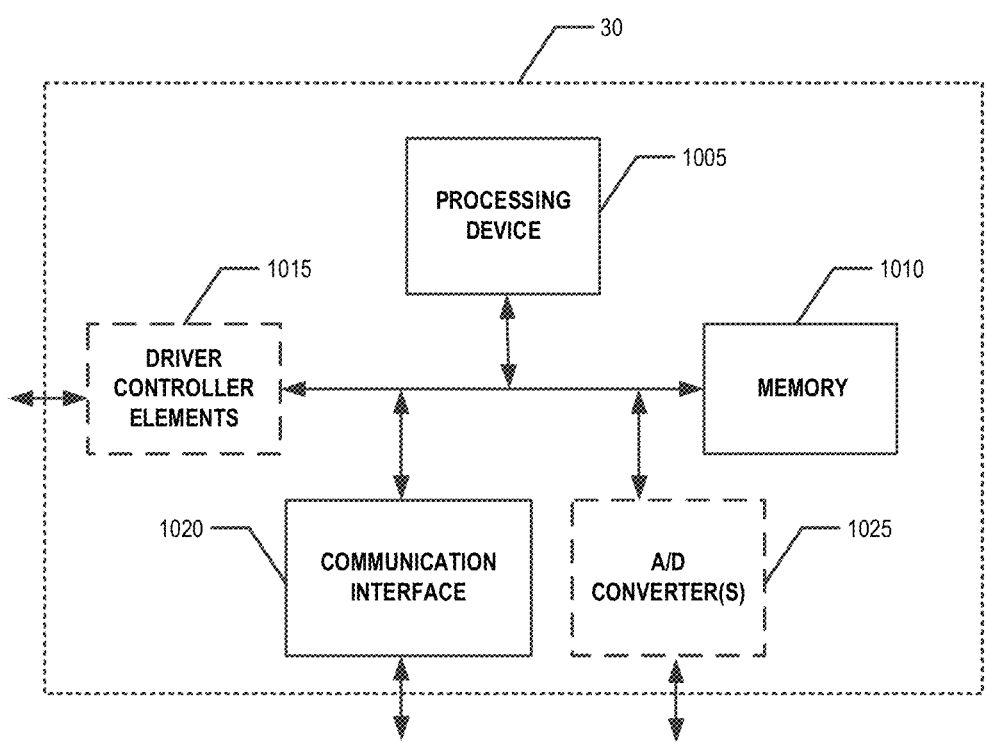

FIG. 10 provides a schematic diagram of an example controller of a quantum computer configured to perform one or more decreased crosstalk reading and/or detection functions, according to various embodiments.

Figure 11:
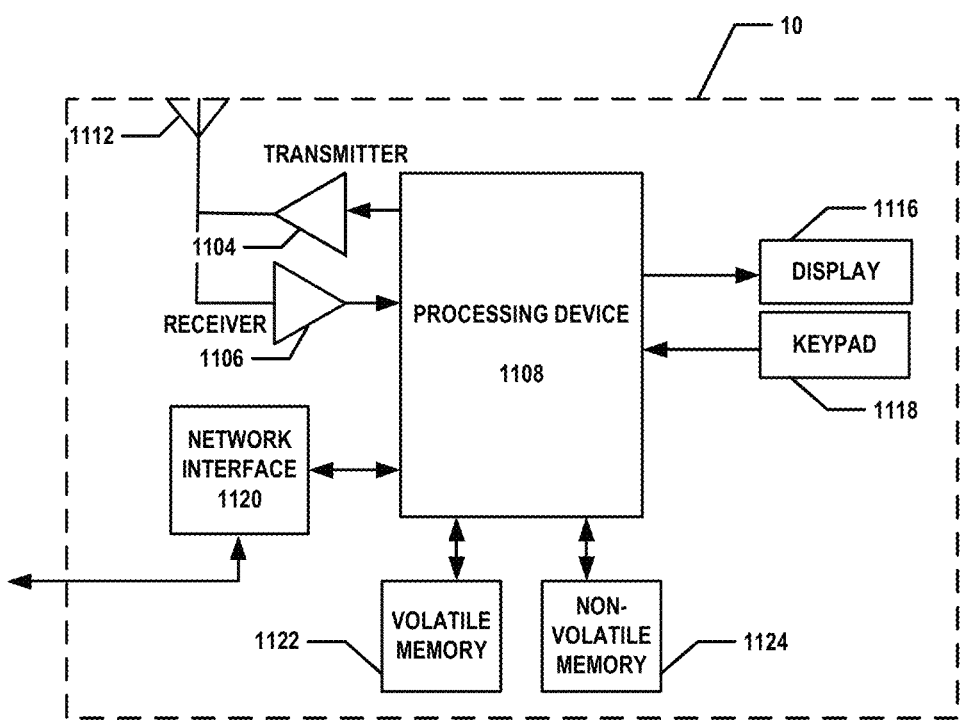

FIG. 11 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

In various embodiments, methods, apparatuses, systems, computer program products, and/or the like for performing various reduced crosstalk reading and/or detection functions. In various embodiments, at least two atomic objects are confined within an atomic object confinement apparatus (also referred to as a confinement apparatus herein). In various embodiments, the atomic objects are ions or atoms. In various embodiments, the atomic object may be part of an atom or ion crystal comprising a qubit atomic object (e.g. a qubit ion) and a sympathetic cooling (SC) atomic object (e.g., SC ion). In various embodiments, the confinement apparatus is a trap or other apparatus configured to confine the atomic objects. For example, in an example embodiment, the atomic objects are ions and the confinement apparatus is an ion trap (e.g., a surface ion trap).

Figure 1:
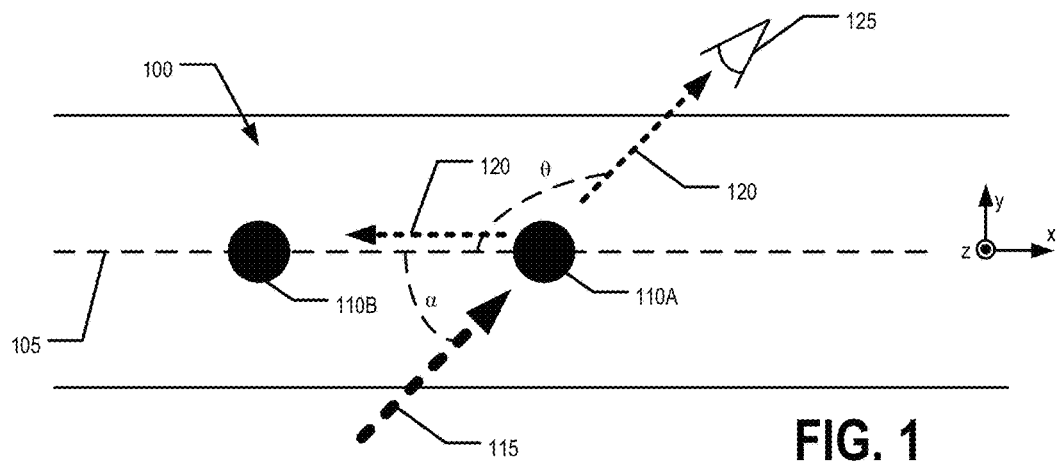
FIG. 1 is a schematic diagram of a reading and/or detection function.

In various embodiments, the confinement apparatus is configured to enable the performance of a reading and/or detection function. In particular, a reading and/or detection function may be used to determine whether an atomic object is in a particular quantum state or not. FIG. 1 provides a schematic top view of an example reading and/or detection function. Atomic objects 110 (e.g., 110A, 110B) are confined within a confinement region 100 of a confinement apparatus. The example confinement apparatus comprises at least one radio frequency (RF) electrode and a plurality of longitudinal electrodes. In various embodiments, the at least one RF electrode generates a trapping field configured to confine the atomic objects 110 within the confinement region 100 of the confinement apparatus. The at least one RF electrode defines an RF null axis 105 of the confinement region 100. In an example embodiment, the RF null axis 105 is the longitudinal axis of at least a portion of the confinement region 100. In general, the atomic objects 110 are located along the RF null axis 105. A reading beam 115 may be provided to the confinement region 100 such that the reading beam 115 is at least partially incident on the atomic object being read and/or detected 110A. In various embodiments, the reading beam 115 is incident on the atomic object read and/or detected at a reading incident angle α. In various embodiments, the reading beam 115 is a laser beam that is characterized by a frequency/wavelength that is resonant with a particular transition of the atomic object being read and/or detected 110A. For example, the particular transition may be from a first state (e.g., qubit state 1) to another state (e.g., qubit state 0 or another quantum state of the atomic object). When the reading beam 115 is incident on the atomic object being read and/or detected 110A and the atomic object is in the first state, the atomic object being read and/or detected 110A fluoresces by emitting stimulated emission 120. In various embodiments, the stimulated emission 120 is emitted by atomic object being read and/or detected 110A at a variety of emission angles θ. At least some of the stimulated emission 120 is detected by detector 125. In various embodiments, the detector 125 is in communication with a controller and/or other computing entity configured to receive an indication of the detection of the stimulated emission 120 by the detector 125.

Figure 2:
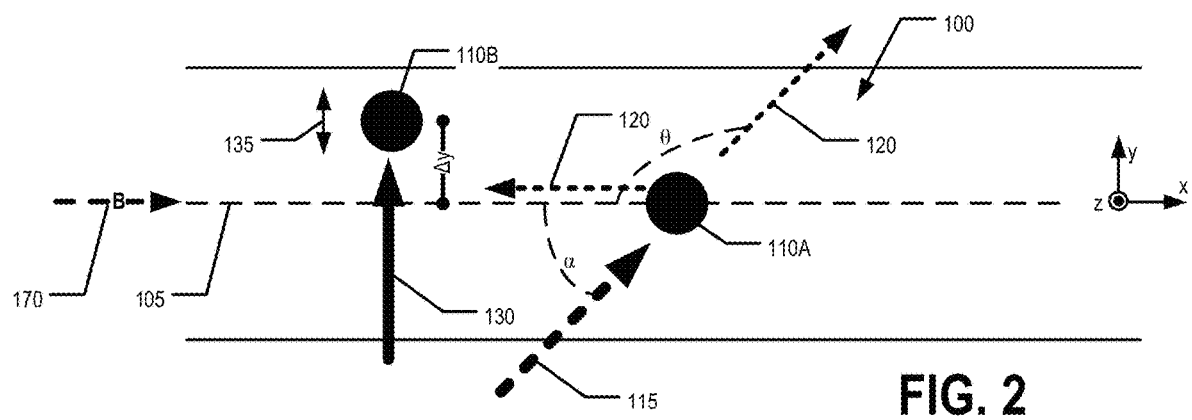
FIG. 2 is a schematic diagram of a decreased crosstalk reading and/or detection function in accordance with an example embodiment.
Figure 3:
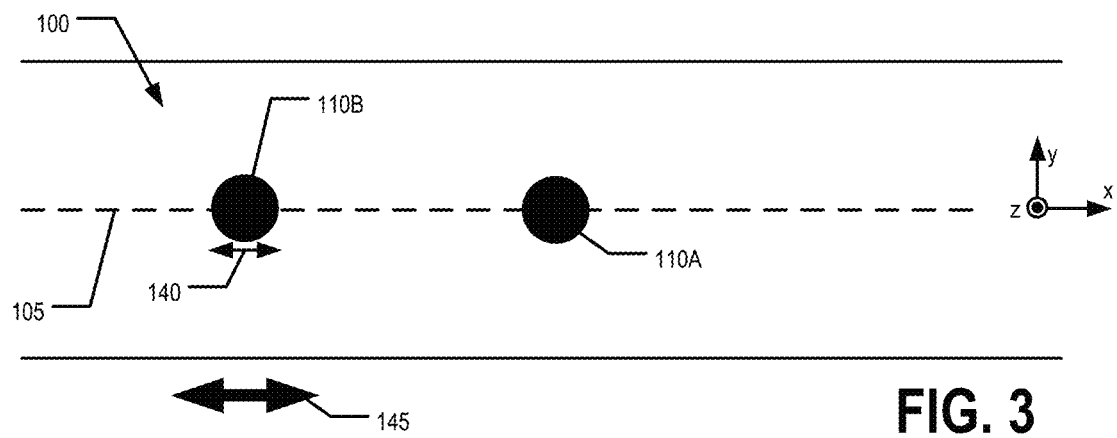
FIG. 3 is a schematic diagram of another decreased crosstalk reading and/or detection function in accordance with an example embodiment.

However, photons from the reading beam 115 and/or the stimulated emission 120 may be incident on neighboring atomic object(s) 110B. In various embodiments, the neighboring atomic objects 110B and the atomic object being read and/or detected are the same species of atomic objects and therefore have the same atomic structures. Thus, a neighboring atomic object may absorb a photon of the reading beam 115 and/or stimulated emission 120 and thereby corrupt the quantum information stored by the neighboring atomic object (e.g., the qubit may be decohered and/or the like). As used herein, a neighboring atomic object 110B is an atomic object that neighbors and/or is adjacent to the atomic object being read and/or detected 110A and/or that is close enough to the atomic object being read and/or detected 110A that photons from the reading beam 115 and/or the stimulated emission 120 may be incident thereon. In various embodiments, a push field and/or an oscillating potential may be generated (e.g., via application of control signals to the at least RF electrode and/or at least one of the plurality of longitudinal electrodes) and experienced by one of the neighboring atomic object(s) 110B or the atomic object to be read and/or detected 110A to cause the atomic object experiencing the push field and/or the oscillating potential to oscillate and/or experience a small back and forth motion that causes suppression of absorption of photons from the reading beam 115 and/or stimulated emission 120 by the neighboring atomic object(s) 110B. In particular, the oscillations and/or small back and forth motion of the atomic object experiencing the push field and/or oscillating potential causes the reading beam 115 and/or stimulated emission 120 to be off-resonance for the neighboring atomic object(s) 110B. In other words, in various embodiments, the oscillations and/or small back and forth motion of the atomic object experiencing the push field and/or oscillating potential causes the reading beam 115 and/or stimulated emission 120 to be characterized by a frequency/wavelength that is not resonant with the particular transition of the neighboring atomic object(s) 110B. For example, FIG. 2 provides a schematic diagram of a neighboring atomic object 110B experiencing a push field 130, FIG. 3 provides a schematic diagram of a neighboring atomic object 110B experiencing an oscillating potential 145, and FIG. 7 provides a schematic diagram of an atomic object to be read and/or detected 100A experiencing a push field 130 and having a modulated reading beam 115' incident thereon, in accordance with various embodiments of the present disclosure.

As absorption of photons from the reading beam 115 and/or stimulated emission 120 is suppressed in various embodiments, the crosstalk between the neighboring atomic object(s) 110B and the atomic object being read and/or detected 110A is reduced. In an example embodiment, the absorption of photons from the reading beam 115 and/or stimulated emission 120 is suppressed by at least a factor of ten. In an example embodiment, the absorption of photons from the reading beam 115 and/or stimulated emission 120 is suppressed by at least a factor of twenty. In an example embodiment, the absorption of photons from the reading beam 115 and/or stimulated emission 120 is suppressed by a factor of approximately 30. In an example embodiment, the absorption of photons from the reading beam 115 and/or stimulated emission 120 is completely (e.g., 100%) suppressed.

Exemplary Atomic Object Confinement Apparatus

FIG. 4 provides a top view of an example confinement apparatus 400 that may be used to confine the at least two atomic objects 110. For example, in an example embodiment, the confinement apparatus is an ion trap (e.g., a surface ion trap) and the atomic objects are ions. In an example embodiment, the confinement apparatus 100 (e.g., surface ion trap) is fabricated as part of an ion trap chip and/or part of an ion trap apparatus and/or package. In an example embodiment, the confinement apparatus 400 is at least partially defined by a number of RF electrodes 412 (e.g., 412A, 412B). In various embodiments, the confinement apparatus 400 is at least partially defined by a number of sequences of longitudinal electrodes 414 (e.g., 414A, 414B, 414C). Each sequence of longitudinal electrodes 414 comprises a plurality of longitudinal electrodes 416. In an example embodiment, each longitudinal electrode 416 and/or at least a non-empty subset of the longitudinal electrodes 416 may be operated independently via the application of control signals thereto. In an example embodiment, the confinement apparatus 400 is a surface Paul trap with symmetric RF electrodes 412. In various embodiments, the RF electrodes 412 and the longitudinal electrodes 416 generate potentials and/or fields that are experienced by atomic objects 110 within a confinement region 100 of the confinement apparatus 400. In particular, the RF electrodes 412 may be configured to define the confinement region 100 of the confinement apparatus 400 and the longitudinal electrodes 416 may be configured to at least partially control movement and/or motion of atomic objects within the confinement region 100.

In various embodiments, the upper surface of the confinement apparatus 400 has a planarized topology. For example, the upper surface of each RF electrode 412 of the number of RF electrodes 412 and the upper surface of each longitudinal electrode 416 of the number of sequences of longitudinal electrodes 414 may be substantially coplanar.

In various embodiments, the confinement apparatus 400 comprises and/or is at least partially defined by a number of RF electrodes 412. The RF electrodes 412 are formed with substantially parallel longitudinal axes 411 (e.g., 411A, 411B) and with substantially coplanar upper surfaces. For example, the RF electrodes 412 are substantially parallel such that a distance between the RF electrodes 412 is approximately constant along the length of the RF electrodes 412 (e.g., the length of an RF electrode being along the longitudinal axes 411 of RF electrode 412). For example, the upper surfaces of the RF electrodes 412 may be substantially flush with the upper surface of the confinement apparatus 400. In an example embodiment, the number of RF electrodes 412 comprises two RF electrodes 412 (e.g., 412A, 412B). In various embodiments, the confinement apparatus 400 may comprise a plurality of number of RF electrodes 412. For example, the confinement apparatus 400 may be a two-dimensional ion trap that comprises multiple numbers (e.g., pairs and/or sets) of RF electrodes 412 with each number (e.g., pair and/or set) of RF electrodes 412 having substantially parallel longitudinal axes 411. In an example embodiment, a first number of RF electrodes 412 have mutually substantially parallel longitudinal axes 411, a second number of RF electrodes 412 have mutually substantially parallel longitudinal axes 411, and the longitudinal axes of the first number of RF electrodes and the longitudinal axes of the second number of RF electrodes are substantially non-parallel (e.g., transverse). FIG. 4 illustrates an example one dimensional confinement apparatus 400 and/or a portion of a two dimensional confinement apparatus 400 having two RF electrodes 412, though other embodiments may comprise additional RF electrodes in various configurations.

In various embodiments, two adjacent RF electrodes 412 may be separated (e.g., insulated) from one another by a longitudinal gap. In various embodiments, the confinement region 100 is at least partially over the longitudinal gap. For example, the longitudinal gap may define (in one or two dimensions) the confinement region 100. In various embodiments, the confinement region 100 may extend substantially parallel to the longitudinal axes 411 of the adjacent RF electrodes 412. For example, the longitudinal gap may extend substantially parallel to the x-axis as shown in FIGS. 1-4. In an example embodiment, the longitudinal gap may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap has a height (e.g., in the y-direction) of approximately 40 μm to 500 μm. In various embodiments, one or more sequences of longitudinal electrodes 414 (e.g., a second sequence of longitudinal electrodes 414B) may be disposed and/or formed within the longitudinal gap.

In an example embodiment, a transverse gap may exist between neighboring and/or adjacent longitudinal electrodes 416 of the one or more sequences of electrodes 414. In an example embodiment, the transverse gap may be empty space and/or at least partially filled with a dielectric material to prevent electrical communication between neighboring and/or adjacent electrodes. In an example embodiment, the transverse gap between neighboring and/or adjacent electrodes may be in the range of approximately 1-10 μm.

In an example embodiment, a longitudinal gap exists between a sequence of longitudinal electrodes 414 and a neighboring and/or adjacent RF electrode 412. In an example embodiment, the longitudinal gap may be at least partially filled with a dielectric and/or insulating material to prevent electrical communication between longitudinal electrodes 416 of the sequence of electrodes 414 and the RF electrode 412. In an example embodiment, the longitudinal gap between neighboring and/or adjacent electrodes may be in the range of approximately 1-10 μm.

In various embodiments, the confinement apparatus 400 may be at least partially defined by a number of sequences of longitudinal electrodes 414 (e.g., first sequence of longitudinal electrodes 414A, second sequence of longitudinal electrodes 414B, third sequence of longitudinal electrodes 414C). Each sequence of longitudinal electrodes 414 is formed to extend substantially parallel to the substantially parallel longitudinal axes 411 of the RF electrodes 412. For example, the number of sequences of longitudinal electrodes 414 may extend substantially parallel to the x-axis as shown in FIG. 4. In various embodiments, the number of sequences of longitudinal electrodes 414 comprises two, three, four, and/or another number of sequences of longitudinal electrodes 414. In an example embodiment, the confinement apparatus 400 comprises a plurality of number of sequences of longitudinal electrodes 414. For example, the illustrated confinement apparatus 400 is a one-dimensional ion trap comprising three sequences of longitudinal electrodes 414. For example, the confinement apparatus 400 may be a two-dimensional ion trap that comprises multiple numbers of sequences of longitudinal electrodes 414 that each extend substantially parallel to a substantially parallel longitudinal axes of a corresponding number of RF electrodes 412. In an example embodiment, a first number of sequences of longitudinal electrodes 414 extend substantially parallel to the substantially parallel longitudinal axes 411 of a first number of RF electrodes 412, a second number of sequences of longitudinal electrodes 414 extend substantially parallel to the substantially parallel longitudinal axes 411 of a second number of RF electrodes 412, and the longitudinal axes of the first number of RF electrodes and the longitudinal axes of the second number of RF electrodes are substantially non-parallel (e.g., transverse). In some embodiments, each of the longitudinal electrodes 416 of the number of sequences of longitudinal electrodes 414 can be formed with substantially coplanar upper surfaces that are substantially coplanar with the upper surfaces of the RF electrodes 412.

In an example embodiment (e.g., as illustrated in FIG. 4), a number (e.g., pair) of RF electrodes 412 may be formed between a first sequence of longitudinal electrodes 414A and a third sequence of longitudinal electrodes 414C with a second sequence of longitudinal electrodes 414B extending along the longitudinal gap between the RF electrodes 412. For example, each sequence of longitudinal electrodes 414 may extend in a direction substantially parallel to the longitudinal axes 411 of the RF electrodes 412 (e.g., in the x-direction). In various embodiments, the upper surfaces of the sequences of longitudinal electrodes 414 are substantially coplanar with the upper surfaces of the RF electrodes 412.

In various embodiments, RF signals may be applied to the RF electrodes 412 to generate an electric and/or magnetic field that acts to maintain an atomic object (e.g., ion) trapped within the confinement apparatus 400 in directions transverse to the longitudinal direction of the confinement apparatus 400 (e.g., the y- and z-directions). In various embodiments, control signals and/or voltages are applied to the longitudinal electrodes 416 to generate a desired electric potential field within the confinement region 100. For example, in various embodiments, time-dependent, time-varying, time evolving, and/or non-static direct current (DC) voltages may be applied to the longitudinal electrodes 416 to generate a time-dependent, time-varying, time evolving, and/or non-static electric potential field that causes the atomic objects trapped within the confinement apparatus 400 to traverse corresponding trajectories to within the confinement region 100. For example, the atomic objects may be moved between various zones of the confinement apparatus 400 such that various functions may be performed thereon. For example, the atomic objects may be initialized, gated via single qubit gates, gated via double/multiple qubit gates, transported and/or stored, read and/or detected, and/or the like. In an example embodiment, the longitudinal electrodes 416 are configured to, responsive to control signals applied thereto, generate push fields and/or oscillating potentials configured to cause an atomic object experiencing the push field and/or oscillating potential to experience oscillations and/or small back and forth movements. In various embodiments, a push field 130 is configured to push an atomic object off of the RF null axis 105 (which is co-located with the longitudinal axis 405 of the confinement region 100 in an example embodiment) of the confinement apparatus 400. An atomic object pushed off of the RF null axis 105 will experience a potential (e.g., at least partially generated by application of the RF signal to the RF electrodes 412) that causes the atomic object to oscillate and/or experience small back and forth motions in a direction transverse (e.g., perpendicular, in an example embodiment) to the RF null axis 105 at the location of the atomic object along the RF null axis 105/longitudinal axis 405 of the confinement apparatus 400. For example, pushing an atomic object radially away from the RF null axis 105 (e.g., in a y-z plane) will experience a potential that causes the atomic object to oscillate and/or experience small back and forth motions in a radial direction of the confinement region (e.g., in the y direction when the atomic object is pushed off the RF null axis 105 in the y direction, as shown in FIGS. 2 and 7). In various embodiments, an oscillating potential 145 is configured to cause the atomic object experiencing the oscillating potential 145 to oscillate and/or experience small back and forth motions in a direction substantially parallel to RF null axis 105/longitudinal axis 405 of the confinement apparatus 400. For example, experiencing an oscillating potential will cause an atomic object to oscillate and/or experience small back and forth motions in a longitudinal direction of the confinement region 100 (e.g., in the x direction, as shown in FIG. 3).

In various embodiments, the control signals and/or voltages applied to the longitudinal electrodes 416 are controlled by one or more connected devices (e.g., a controller 30 as shown in FIG. 9 and/or the like) via leads. For example, depending on the electric monopole and/or dipole (or higher magnitude pole) strength (e.g., electric charge in the case of an electric monopole) of the atomic object, longitudinal voltages may be raised or lowered for longitudinal electrodes 416 in the vicinity of a particular atomic object to cause the particular atomic object to traverse a desired trajectory. For example, a controller 30 may control a voltage driver to cause the voltage driver to apply control signals and/or longitudinal voltages to the longitudinal electrodes to generate a time-dependent electric potential (e.g., an electric potential that evolves, changes, and/or varies with time) that causes the atomic objects within the confinement apparatus 400 to traverse desired trajectories. In various embodiments, the controller 30 may control a voltage driver (or other signal generator) to cause the voltage driver (or other signal generator) to generate an electric potential that causes one or more neighboring atomic objects 110B to oscillate or experience small back and forth motions such that crosstalk is reduced during a read and/or detection function.

Depending on such factors as the electric monopole and/or dipole (or higher magnitude pole) strength (e.g., electric charge in the case of an electric monopole) of the atomic objects and/or the shape and/or magnitude of the combined electrical and/or magnetic fields, the atomic objects can be stabilized at a particular distance (e.g., approximately 20 μm to approximately 200 μm) above an upper surface of the confinement apparatus 400 (e.g., the coplanar upper surface of the sequences of longitudinal electrodes 414 and RF electrodes 412). To further contribute to controlling the transit of atomic objects along desired trajectories, the confinement apparatus 400 may be operated within a cryogenic and/or vacuum chamber capable of cooling the confinement apparatus 400 to a temperature of less than 124 Kelvin (e.g., less than 100 Kelvin, less than 50 Kelvin, less than 10 Kelvin, less than 5 Kelvin, and/or the like), in various embodiments.

In various embodiments, the RF electrodes 412, the sequences of electrodes 414, and/or the confinement potential generated by the RF electrodes and/or the sequences of electrodes 414 define a confinement region 100 of the confinement apparatus 400. In an example embodiment, the RF electrodes 412 and/or the confinement potential generated by the RF electrodes define a confinement region 100 of the confinement apparatus 400 and the longitudinal electrodes 416 control the movement and/or positioning of the atomic objects 110 within the confinement region 100. In various embodiments, the RF electrodes 412, the sequences of electrodes 414, and/or the confinement potential generated by the RF electrodes and/or the sequences of electrodes 414 define an axis 405 of the confinement apparatus 400. For example, the RF electrodes 412 and/or the confinement potential generated by the RF electrodes may define an axis 405 of the confinement apparatus 400. In various embodiments, the confinement potential generally acts to align the atomic objects 110 within the confinement apparatus 400 along the RF null axis 105 and/or the longitudinal axis 405 of the confinement apparatus 400.

Exemplary Decreased Crosstalk Reading and/or Detection Function

In various embodiments, a controller 30 may control one or more drivers to cause a plurality of potential generating elements (e.g., RF electrodes 412 and longitudinal electrodes 416) of a confinement apparatus to generate a time-dependent potential field (e.g., a potential field that evolves with time) that causes the atomic objects 110 to be confined within the confinement region 100 of the confinement apparatus 400. An example quantum computer 910 and controller 30 are described in more detail elsewhere herein with respect to FIGS. 9 and 10. The controller 30 may control the one or more drivers (e.g., voltage sources 50), manipulation sources 60 (e.g., lasers), and/or the like to cause a quantum circuit to be performed using the at least two atomic objects 110 within the confinement apparatus 400. A quantum circuit is a computational routine comprising coherent quantum operations on quantum data, such as qubits (e.g., the atomic objects 110). For example, a quantum circuit comprises an ordered sequence of quantum gates. Execution and/or performance of a quantum circuit by a quantum computer causes the quantum computer to perform a corresponding algorithm. For example, to perform an algorithm and/or computation, a quantum computer may perform and/or execute a quantum circuit which comprises first initializing two or more qubits (e.g., the atomic objects 110) into an initial quantum state, then performing an ordered series of quantum gates and/or other operations on the two or more qubits, and finally reading and/or detecting the quantum state of at least one of the qubits to determine an outcome and/or result of performing the algorithm and/or computation.

In an example embodiment, a quantum circuit may comprise reading and/or detecting the quantum state of at least one of the qubits in the middle of the quantum of circuit. For example, after the performance of one or more gates, the quantum state of one or more of the qubits may be read and/or detected, and then one or more further gates may be performed. In an example embodiment, the one or more further gates may be determined, modified, adjusted, selected, ordered, and/or the like based at least in part on the result of reading and/or detecting the quantum state of the at least one qubit in the middle of the quantum circuit. To enable reading and/or detecting the quantum state of at least one qubit during the performance of the quantum circuit (e.g., in the middle of the quantum circuit), the reading and/or detection function is configured so as to reduce the probability of quantum information/data stored by a qubit 110B neighboring a qubit being read and/or detected 110A will be disturbed, disrupted, destroyed, and/or the like during the reading and/or detecting of the qubit being read and/or detected 110A. FIG. 5 provides a flowchart illustrating processes, procedures, operations, and/or the like performed by a controller 30, for example, to control a quantum computer and/or cause a quantum circuit to be executed and/or performed that includes an example embodiment of a decreased crosstalk reading and/or detection function 500. In particular, the decreased crosstalk reading and/or detection function 500 decreases and/or reduces the probability of the quantum information/data stored by a neighboring qubit 110B being disturbed, disrupted, destroyed, and/or the like during the reading and/or detecting of the qubit being read and/or detected 110A. For example, the decreased crosstalk reading and/or detecting function 500 may suppress the absorption of photons from a reading beam 115 and/or stimulated emission 120 by a neighboring qubit (e.g., neighboring atomic object 110B) when another qubit (e.g., the atomic object being read and/or detected 110A) is read and/or detected.

Starting at step/operation 502, the controller 30 causes the quantum computer 910 to begin executing and/or performing a quantum circuit. For example, the controller 30 may receive a quantum circuit and/or other executable instructions (e.g., from computing entity 10 via one or more wired and/or wireless networks) that causes the controller 30 to control one or more drivers such that voltage sources 50, manipulation sources 60, and/or other components of the quantum computer 910 start to perform a quantum circuit. For example, the controller 30 may cause at least two atomic objects 110 to be loaded into a confinement apparatus 400, initialized into a particular qubit state (e.g., a known state within the defined qubit space of the atomic object 110), and positioned in particular positions within the confinement apparatus 400. The controller 30 may then cause one or more gates (e.g., using the one or more manipulation sources 60) to be performed on the one or more atomic objects 110 such that the quantum state of the atomic objects 110 is evolved in a particular manner within the defined qubit space of the atomic objects 110.

As the controller 30 executes and/or performs the quantum circuit, the controller 30 may determine, at step/operation 504, that a reading and/or detecting function is to be performed on one or more atomic objects 110 such that the quantum state of the atomic object may be determined (e.g., whether the atomic object is in qubit state 0 or 1). In an example embodiment, the controller 30 may determine that a reading and/or detecting function is to be performed in the middle of a quantum circuit (e.g., after one or more gates have been performed and one or more gates will be performed after the reading and/or detecting function). In an example embodiment, the controller 30 may determine that a reading and/or detecting function is be performed at the end of the quantum circuit (e.g., after all of the gates of the quantum circuit have been performed). For example, the controller 30 may determine that the quantum circuit and/or the executable instructions that causes the controller 30 to control components of the quantum computer 910 to perform the quantum circuit includes an indication and/or executable instructions for performing the reading and/or detecting function. For example, the controller 30 may determine that executable instructions for performing a reading and/or detecting function are queued for execution by a processor and/or processing device of the controller 30.

The controller 30 may then execute the executable instructions for performing a decreased crosstalk reading and/or detecting function 500 via the processing device 1005 of the controller 30. For example, at step/operation 506, the controller 30 may cause the voltage sources 50 to provide first control signals to one or more longitudinal electrodes 416 that causes one or more neighboring atomic objects 110B to experience a push field 130, as illustrated in FIG. 2. In various embodiments, the push field 130 causes the one or more neighboring atomic objects 110B to experience a radial force (e.g., in the y-direction) away from the RF null axis 105 and/or longitudinal axis 405 of the confinement apparatus 400. For example, the push field 130 may cause the one or more neighboring atomic objects 110B to be displaced a displacement distance Δy from the RF null axis 105 and/or longitudinal axis 405. When an atomic object 110 leaves the RF null axis 105, the atomic object 110 begins to feel the oscillations within the confinement potential generated by the RF electrodes 412 via application of an RF voltage (e.g., a voltage with an oscillation rate of an alternating electric current or voltage in the frequency range of approximately 20 kHz to 300 GHz) to the RF electrodes 412. The oscillations within the confinement potential causes the atomic object 100 to oscillate and/or experience a small back and forth motion 135 in a radial direction (e.g., in the y-direction).

The displacement distance Δy is given by $$\Delta y = \frac{QE_y}{m\omega_y^2},$$

where Q is the charge of the atomic object, $E_y$ is the electric field strength of the push field 130 in the y-direction, m is the mass of the atomic object, and $\omega_y$ is the harmonic confinement frequency (of the confinement potential) along the y direction. The amplitude A of the oscillation and/or small back and forth motion 135 is given by $$A = \sqrt{2}\frac{\omega_y \Delta y}{\Omega},$$

where Ω is the oscillation frequency of the RF voltage (e.g., generated by a voltage source 50) applied to the RF electrodes 412. The modulation index n is then given by $$n = \frac{2\pi}{\lambda} A \cos(\varphi_p),$$

where λ is the wavelength of the reading beam 115 and/or stimulated emission 120 and $\varphi_p$ is the incident angle of the photon of the reading beam 115 (α) and/or stimulated emission 120 (θ) with respect to the atomic object 110. For example, the reading beam 115 has an incident angle of α. In an example embodiment the incident angle of the reading beam 115 is in the range of 30-60° (e.g., α=30-60°). In various embodiments, the incident angle α provides a non-zero value for the cosine of α (e.g., α does not equal 90°). In an example embodiment, the incident angle of the stimulated emission 120 incident on a neighboring atomic object 110B is approximately θ=0.

At step/operation 508, the controller 30 causes at least one manipulation source 60 to generate and provide a reading beam 115. For example, the reading beam 115 may be a laser beam that is tuned to a particular transition of the atomic object being read and/or detected 110A. The reading beam 115 is provided (e.g., at incident angle α) such that at least a portion of the reading beam 115 is incident on the atomic object being read and/or detected 110A. When the atomic object being read and/or detected 110A is in a particular qubit state (e.g., state 1), the reading beam 115 being incident on the atomic object being read and/or detected 110A causes the atomic object 110A to emit stimulated emission 120. Some of the stimulated emission 120 is detected by detector 125. When the atomic object being read and/or detected 110A is not in the particular qubit state (e.g., is in state 0 rather than state 1), the atomic object will not emit stimulated emission 120 responsive to the reading beam 115 being incident on the atomic object 110A.

While the reading beam 115 is provided such that at least a portion of the reading beam 115 is incident on the atomic object being read and/or detected 110A, some of the reading beam 115 may be incident on one or more neighboring atomic objects 110B. As the neighboring atomic object 110B experiences the oscillation and/or small back and forth motion 135, the neighboring atomic object 110B sees the reading beam 115 as being off-resonant with the particular transition of the atomic object. For example, due to the Doppler effect associated with the oscillation and/or small back and forth motion 135 of the neighboring atomic object 110B, in the reference frame of the neighboring atomic object 110B, the reading beam 115 is off-resonant with the particular transition of the neighboring atomic object. The modulation of the frequency of the reading beam 115 in the reference frame of a neighboring atomic object such that the sideband frequency is greater than the (e.g., a factor of two, a factor of ten, and/or the like greater than) the natural linewidth of the particular transition. Thus, absorption of photons of the reading beam 115 by the neighboring atomic object is suppressed.

For example, FIG. 6A provides a plot showing the effect on the absorption of photons from the reading beam 115 as a function of the field strength of the push field 130 (e.g., $E_y$). In the illustrated example embodiment, when the field strength of the push field 130 is in the range of 1050-1250 V/m (e.g., 1150-1200 V/m), the modulation index is approximately 2.4 (e.g., n≈2.4) resulting, in the reference frame of the neighboring atomic object 110B, the power of the reading beam 115 is approximately zero at the frequency/wavelength that is resonant with the particular transition of the atomic objects. Rather, in the reference frame of the neighboring atomic object 110B, the power of the reading beam 115 is present in frequency modulation sidebands. Thus, the absorption of photons from the reading beam 115 by the neighboring atomic object 110B experiencing oscillations and/or small back and forth motion 135 is suppressed. In other words, since the neighboring atomic object 110B sees the power of the reading beam 115 present in the frequency modulation sidebands, which are off-resonant for quantum transitions of the atomic objects, the probability of the neighboring atomic object 110B absorbing a photon from the reading beam 115 is greatly reduced. For example, as shown in FIG. 6A, in the illustrated example, embodiment, when the field strength of the push field 130 is in the range of 1050-1250 V/m (e.g., 1150-1200 V/m), the absorption of photons from the reading beam 115 by the neighboring atomic object 110B is reduced to approximately 0.033. For example, FIG. 6B provides a plot showing the suppression factor for suppressing absorption of photons from the reading beam 115 by the neighboring atomic object 110B as a function of the field strength of the push field 130. In the illustrated example embodiment, when the field strength of the push field 130 is in the range of 1050-1250 V/m (e.g., 1150-1200 V/m), the suppression factor reaches a first maximum of approximately 30.

Returning to FIG. 5, at step/operation 510, the controller 30 may cause the voltage sources 50 to provide second control signals to one or more longitudinal electrodes 416 that causes one or more neighboring atomic objects 110B to experience an oscillating potential 145, as illustrated in FIG. 3. In various embodiments, the oscillating potential causes the one or more neighboring atomic objects 110B to experience an oscillating longitudinal force (e.g., in the x-direction and/or substantially parallel to the RF null axis 105 and/or longitudinal axis 405 of the confinement apparatus 400). When the neighboring atomic object 110B feels the oscillations of the oscillating potential 145, the neighboring atomic object 110B begins to oscillate and/or experience a small back and forth motion 140 in the longitudinal direction (e.g., in the x-direction). In general, the oscillating potential 145 is configured to cause the neighboring atomic object 110B begin to oscillate and/or experience small back and forth motion 140 in a direction that is substantially parallel to and/or comprises a component that is substantially parallel to the direction between the neighboring atomic object 110B and the atomic object being read and/or detected 110A.

Due to the oscillation and/or small back and forth motion 140, at least a component of which is substantially parallel to the direction stimulated emission 120 would travel from the atomic object being read 110A to the neighboring atomic object 110B, the stimulated emission 120 will be off-resonant for quantum transitions of the atomic objects in the reference frame of the neighboring atomic object 110B. Thus, absorption of the stimulated emission 120 by the neighboring atomic object 110B is suppressed and/or decreased. The longitudinal electrodes 416 may be controlled such that after a period of time (e.g., a time period in which its expected at least most of the stimulated emission 120 has been emitted) the longitudinal electrodes 416 cease generating the oscillating potential 145. In an example embodiment, the strength of the oscillating potential 145 may be decreased in an at least semi-smooth manner rather than being abruptly turned off.

In an example embodiment, the control signals provided to the longitudinal electrodes 416 is filtered to reduce high frequency noise. In an example embodiment, the filters used to filter the control signals provided to the longitudinal electrodes 416 are configured to allow and/or pass signals of a particular frequency such that the longitudinal electrodes 416 may generate the oscillating potential.

At step/operation 512, the controller 30 controls the magnetic field generator 70 to generate a magnetic field 170 experienced by the neighboring atomic object 110B as having a magnetic field direction and a particular amplitude. In an example embodiment, the magnetic field generator 70 is a permanent magnet and the controller 30 need not control the magnetic field generator 70. In an example embodiment, the magnetic field generator 70 is configured to generate and/or maintain a substantially stable magnetic field having a magnetic field direction and a particular amplitude throughout the operation of the quantum computer 910 and/or the performance of a quantum circuit and/or algorithm. Thus, the controller 30 controls the magnetic field generator 70 to maintain the magnetic field 170 such that the neighboring atomic object 110B experiences the magnetic field 170 having the magnetic field direction and the particular amplitude, in an example embodiment. In various embodiments, the magnetic field direction experienced by the neighboring atomic object 110B is transverse (e.g., not parallel or anti-parallel) to the gradient of the oscillating potential 145 and/or transverse to an axis defined by the small back and forth motion 135. For example, as illustrated in FIG. 2, in an example embodiment, the magnetic field direction experienced by the neighboring atomic object 110B is perpendicular to the gradient of the oscillating potential 145 and/or perpendicular to the axis defined by the small back and forth motion 135. In an example embodiment, the magnetic field direction is generally and/or substantially parallel to the direction separating the neighboring atomic object 110B and the atomic object being read and/or detected 110A.

Due to the zero in the lobed emission pattern of π-polarized light by an atomic object and the magnetic field direction being generally and/or substantially parallel to the direction separating the neighboring atomic object 110B and the atomic object being read and/or detected 110A, any stimulated emission 120 (e.g., photons) emitted by the atomic object being read and/or detected 110A in the direction of the neighboring atomic object 110B will not have a π-polarized component (e.g., the π-polarized component will be substantially equal to zero). As the probability of the neighboring atomic object 110B resonantly absorbing non-π-polarized light is very small (e.g., substantially and/or approximately equal to zero), the absorption of stimulated emission 120 photons by the neighboring atomic object 110B is significantly suppressed and/or reduced. For example, absorption of photons by the neighboring atomic object 110B is suppressed in the direction of the gradient of the oscillating potential 145 and/or the axis defined by the small back and forth motion 135 and suppressed in the magnetic field direction of the magnetic field 170, in an example embodiment.

In various embodiments, steps/operations 506, 508, 510, and/or 512 may be performed in a semi-simultaneous and/or overlapping manner. For example, the field strength of the radial push field may have a triangle wave pulse form over time, such that the field strength of the radial push field increases to a maximum and then decreases again. For example, the time evolution of the field strength of the push field 130 may comprise a monotonic increase to a maximum followed by a monotonic decrease to a minimum. When the field strength of the push field 130 is approximately at its maximum and/or slightly past its maximum, the reading beam 115 may be provided and/or applied. The field strength of the push field 130 may then decrease to a minimum, causing the neighboring atomic object 110B to return to the RF null axis 105 and cease oscillating and/or experiencing the small back and forth motion 135 in the radial direction. In an example embodiment, the controller 30 may cause the longitudinal electrodes 416 to generate the oscillating potential 145 prior to the application of the reading beam 115 to the atomic object being read and/or detected 110A such that the neighboring atomic object 110B is experiencing the oscillations and/or small back and forth motion 140 when the stimulated emission 120 is emitted by the atomic object being read and/or detected 110A.

In an example embodiment, one or more cooling operations may be performed to cool the neighboring atomic objects 110B. For example, cooling the neighboring atomic objects 110B may be performed via direct cooling techniques, sympathetic cooling (e.g., via a sympathetic cooling atomic object), and/or the like. In an example embodiment, the cooling operation may dampen and/or suppress any residual oscillations and/or small back and forth movement of the neighboring atomic objects 110B.

At step/operation 514, the controller 30 may receive a read result. For example, the controller 30 may receive a signal from the detector 125 indicating whether the atomic object being read and/or detected was in a particular qubit state. For example, the signal from the detector 125 may indicate whether the atomic object being read and/or detected 110A was in the first state. The controller 30 may then adjust, modify, update, and/or the like the remaining portion of the quantum circuit based on whether the atomic object being read and/or detected 110A was in the first state. In an example embodiment, multiple atomic objects may be read and the controller 30 may adjust, modify, update, and/or the like the remaining portion of the quantum circuit based on the result of reading the multiple atomic objects. For example, the controller 30 may make changes to the remaining portion of the quantum circuit based on and/or responsive to the result of reading and/or detecting one or more atomic objects during the course of performing and/or executing the quantum circuit.

At step/operation 516, the controller 30 controls various components of the quantum computer 910 to continue performing and/or executing the quantum circuit. For example, the controller may cause the quantum computer 910 to continue performing and/or executing the possibly modified, adjusted, updated, and/or the like quantum circuit. For example, the quantum computer 910 may continue performing and/or executing the quantum circuit, including performing one or more gates, moving atomic objects within the confinement apparatus 400, performing additional reading and/or detecting functions (such as decreased crosstalk reading and/or detecting functions), and/or the like. The controller 30 may then communicate one or more results of performing and/or executing the quantum circuit to a computing entity 10 via one or more wired and/or wireless networks 20.

Another Exemplary Decreased Crosstalk Reading and/or Detection Function

FIG. 7 provides a schematic diagram of another exemplary decreased crosstalk reading and/or detection function 800, as described in FIG. 8. In particular, a push field 130 is applied to the atomic object being read and/or detected 110A that causes the atomic object being read and/or detected 110A to move radially away from the RF null axis 105 and experience oscillations and/or small back and forth motions in a radial direction (e.g., in the y-direction). The frequency/wavelength of the reading beam 115' may then be modulated such that, in the reference frame of the atomic object being read and/or detected 110A, the reading beam 115' is on resonant for a particular transition of the atomic object. However, in the respective reference frames of the neighboring atomic objects 110B, the modulated reading beam 115' will be off-resonant for quantum transitions of the neighboring atomic objects.

FIG. 8 provides a flowchart illustrating various processes, procedures, operations, and/or the like of operating a quantum computer to perform a quantum circuit comprising a decreased crosstalk reading and/or detection function 800, in accordance with an example embodiment. Starting at step/operation 802, the controller 30 causes the quantum computer 910 to begin executing and/or performing a quantum circuit. For example, the controller 30 may receive a quantum circuit and/or other executable instructions (e.g., from computing entity 10 via one or more wired and/or wireless networks) that causes the controller 30 to control one or more drivers such that voltage sources 50, manipulation sources 60, and/or other components of the quantum computer 910 start to perform a quantum circuit. For example, the controller 30 may cause at least two atomic objects 110 to be loaded into a confinement apparatus 400, initialized into a particular qubit state (e.g., a known state within the defined qubit space of the atomic object 110), and positioned in particular positions within the confinement apparatus 400. The controller 30 may then cause one or more gates (e.g., using the one or more manipulation sources 60) to be performed on the one or more atomic objects 110 such that the quantum state of the atomic objects 110 is evolved in a particular manner within the defined qubit space of the atomic objects 110.

As the controller 30 executes and/or performs the quantum circuit, the controller 30 may determine, at step/operation 804, that a reading and/or detecting function is to be performed on one or more atomic objects 110 such that the quantum state of the atomic object may be determined (e.g., whether the atomic object is in qubit state 0 or 1). In an example embodiment, the controller 30 may determine that a reading and/or detecting function is to be performed in the middle of a quantum circuit (e.g., after one or more gates have been performed and one or more gates will be performed after the reading and/or detecting function). In an example embodiment, the controller 30 may determine that a reading and/or detecting function is be performed at the end of the quantum circuit (e.g., after all of the gates of the quantum circuit have been performed). For example, the controller 30 may determine that the quantum circuit and/or the executable instructions that causes the controller 30 to control components of the quantum computer 910 to perform the quantum circuit includes an indication and/or executable instructions for performing the reading and/or detecting function. For example, the controller 30 may determine that executable instructions for performing a reading and/or detecting function are queued for execution by a processor and/or processing device of the controller 30.

The controller 30 may then execute the executable instructions for performing a decreased crosstalk reading and/or detecting function 800 via the processing device 1005 of the controller 30. For example, at step/operation 806, the controller 30 may cause the voltage sources 50 to provide first control signals to one or more longitudinal electrodes 416 that causes the atomic object to be read and/or detected 110A to experience a push field 130, as illustrated in FIG. 7. In various embodiments, the push field 130 causes the atomic object being read and/or detected 110A to experience a radial force (e.g., in the y-direction) away from the RF null axis 105 and/or longitudinal axis 405 of the confinement apparatus 400. For example, the push field 130 may cause the atomic object being read and/or detected 110A to be displaced a displacement distance $\Delta y$ from the RF null axis 105 and/or longitudinal axis 405. When the atomic object being read and/or detected 110A leaves the RF null axis 105, the atomic object 110A begins to feel the oscillations within the confinement potential generated by the RF electrodes 412 via application of an RF voltage (e.g., a voltage with an oscillation rate of an alternating electric current or voltage in the frequency range of approximately 20 kHz to 300 GHz) to the RF electrodes 412. The oscillations within the confinement potential causes the atomic object 100 to oscillate and/or experience a small back and forth motion 135 in a radial direction (e.g., in the y-direction).

Similar to as described above, the displacement distance $\Delta y$ is given by $$\Delta y = \frac{QE_y}{m\omega_y^2},$$

where Q is the charge of the atomic object, $E_y$ is the electric field strength of the push field 130 in the y-direction, m is the mass of the atomic object, and $\omega_y$ is the harmonic confinement frequency (of the confinement potential) along the y direction. The amplitude A of the oscillation and/or small back and forth motion 135 is given by $$A = \sqrt{2}\,\frac{\omega_y \Delta y}{\Omega},$$

where $\Omega$ is the oscillation frequency of the RF voltage (e.g., generated by a voltage source 50) applied to the RF electrodes 412. The modulation index n is then given by $$n = \frac{2\pi}{\lambda} A \cos(\varphi_p),$$

where $\lambda$ is the wavelength of the modulated reading beam 115' and $\varphi_p$ is the incident angle of the photon of the modulated reading beam 115' with respect to the atomic object being read and/or detected 110A. For example, the modulated reading beam 115' has an incident angle of $\alpha$. In an example embodiment the incident angle of the modulated reading beam 115' is in the range of 30-60° (e.g., $\alpha$=30-60°).

At step/operation 808, the controller 30 causes at least one manipulation source 60 to generate and provide a modulated reading beam 115'. For example, the modulated reading beam 115' may be a laser beam that is tuned and modulated to a particular transition of the atomic object being read and/or detected 110A in the reference frame of the atomic object being read and/or detected 110A which is oscillating and/or experiencing small back and forth motions 135. For example, the frequency/wavelength of the reading beam may be modulated such that the when the modulated reading beam 115' is incident on the atomic object being read and/or detected 110A, the frequency/wavelength of the reading beam is on-resonant with the particular transition of the atomic object 110A. The modulated reading beam 115' is provided (e.g., at incident angle $\alpha$) such that at least a portion of the modulated reading beam 115' is incident on the atomic object being read and/or detected 110A. When the atomic object being read and/or detected 110A is in a particular qubit state (e.g., state 1), the modulated reading beam 115' being incident on the atomic object being read and/or detected 110A causes the atomic object 110A to emit stimulated emission 120. Some of the stimulated emission 120 is detected by detector 125. When the atomic object being read and/or detected 110A is not in the particular qubit state (e.g., is in state 0 rather than state 1), the atomic object will not emit stimulated emission 120 responsive to the modulated reading beam 115' being incident on the atomic object 110A.

While the modulated reading beam 115' is provided such that at least a portion of the modulated reading beam 115' is incident on the atomic object being read and/or detected 110A, some of the modulated reading beam 115' may be incident on one or more neighboring atomic objects 110B. However, as the modulated reading beam 115' is modulated to be on resonance for in the reference frame of the atomic object being read and/or detected, which is moving with respect to the respective reference frames of the neighboring atomic objects 110B, the modulated reading beam 115' is off resonance for the quantum transitions of the neighboring atomic objects 110B. Thus, absorption of photons of the modulated reading beam 115' by the neighboring atomic objects 110B is suppressed.

At step/operation 810, the controller 30 may cause the voltage sources 50 to provide second control signals to one or more longitudinal electrodes 416 that causes the atomic object being read and/or detected 110A to experience an oscillating potential 145, similar to as illustrated in FIG. 3. In various embodiments, the oscillating potential causes the atomic object being read and/or detected 110A to experience an oscillating longitudinal force (e.g., in the x-direction and/or substantially parallel to the RF null axis 105 and/or longitudinal axis 405 of the confinement apparatus 400). When the atomic object being read 110A feels the oscillations of the oscillating potential 145, the atomic object 110A begins to oscillate and/or experience a small back and forth motion 140 in the longitudinal direction (e.g., in the x-direction). In general, the oscillating potential 145 is configured to cause the atomic object being read and/or detected 110A begin to oscillate and/or experience small back and forth motion 140 in a direction that is substantially parallel to and/or comprises a component that is substantially parallel to the direction between a neighboring atomic object 110B and the atomic object being read and/or detected 110A.

Due to the oscillation and/or small back and forth motion 140, at least a component of which is substantially parallel to the direction stimulated emission 120 would travel from the atomic object being read 110A to the neighboring atomic object 110B, the stimulated emission 120 will be off-resonant for quantum transitions of the atomic objects in the reference frame of the neighboring atomic object 110B. Thus, absorption of the stimulated emission 120 by the neighboring atomic object 110B is suppressed and/or decreased. The longitudinal electrodes 416 may be controlled such that after a period of time (e.g., a time period in which its expected at least most of the stimulated emission 120 has been emitted) the longitudinal electrodes 416 cease generating the oscillating potential 145. In an example embodiment, the strength of the oscillating potential 145 may be decreased in an at least semi-smooth manner rather than being abruptly turned off.

In various embodiments, steps/operations 806, 808, and/or 810 may be performed in a semi-simultaneous and/or overlapping manner. For example, the field strength of the radial push field may have a triangle wave pulse form over time, such that the field strength of the radial push field increases to a maximum and then decreases again. For example, the time evolution of the field strength of the push field 130 may comprise a monotonic increase to a maximum followed by a monotonic decrease to a minimum. When the field strength of the push field 130 is approximately at its maximum and/or slightly past its maximum, the modulated reading beam 115' may be provided and/or applied. The field strength of the push field 130 may then decrease to a minimum, causing the atomic object being read and/or detected 110A to return to the RF null axis 105 and cease oscillating and/or experiencing the small back and forth motion 135 in the radial direction. In an example embodiment, the controller 30 may cause the longitudinal electrodes 416 to generate the oscillating potential 145 prior to the application of the modulated reading beam 115' to the atomic object being read and/or detected 110A such that the atomic object being read and/or detected 110A is experiencing the oscillations and/or small back and forth motion 140 when the stimulated emission 120 is emitted by the atomic object being read and/or detected 110A.

In an example embodiment, one or more cooling operations may be performed to cool the atomic object being read and/or detected 110A. For example, cooling the atomic object being read and/or detected 110A may be performed via direct cooling techniques, sympathetic cooling (e.g., via a sympathetic cooling atomic object), and/or the like. In an example embodiment, the cooling operation may dampen and/or suppress any residual oscillations and/or small back and forth movement of the atomic object being read and/or detected 110A.

In an example embodiment, the controller 30 may control various components of the quantum computer 910 such that the longitudinal electrodes 416 to generate a push field 130 that is experienced by the atomic object being read and/or detected 110A and an oscillating potential 145 that is experienced by one or more neighboring atomic objects 110B, or vice versa. In various embodiments, the controller 30 may control various components of the quantum computer 910 such that the longitudinal electrodes 416 generate a push field 130 that is experienced by the atomic object being read and/or detected 110A (or neighboring atomic objects 110B) and does not generate an oscillating potential.

At step/operation 812, the controller may receive a read result. For example, the controller 30 may receive a signal from the detector 125 indicating whether the atomic object being read and/or detected was in a particular qubit state. For example, the signal from the detector 125 may indicate whether the atomic object being read and/or detected 110A was in the first state. The controller 30 may then adjust, modify, update, and/or the like the remaining portion of the quantum circuit based on whether the atomic object being read and/or detected 110A was in the first state. In an example embodiment, multiple atomic objects may be read and the controller 30 may adjust, modify, update, and/or the like the remaining portion of the quantum circuit based on the result of reading the multiple atomic objects. For example, the controller 30 may make changes to the remaining portion of the quantum circuit based on and/or responsive to the result of reading and/or detecting one or more atomic objects during the course of performing and/or executing the quantum circuit.

At step/operation 814, the controller 30 controls various components of the quantum computer 910 to continue performing and/or executing the quantum circuit. For example, the controller may cause the quantum computer 910 to continue performing and/or executing the possibly modified, adjusted, updated, and/or the like quantum circuit. For example, the quantum computer 910 may continue performing and/or executing the quantum circuit, including performing one or more gates, moving atomic objects within the confinement apparatus 400, performing additional reading and/or detecting functions (such as decreased crosstalk reading and/or detecting functions), and/or the like. The controller 30 may then communicate one or more results of performing and/or executing the quantum circuit to a computing entity 10 via one or more wired and/or wireless networks 20.

Technical Advantages

Various embodiments provide technical solutions to the technical problem of reading and/or detecting an atomic object within a confinement apparatus without disturbing quantum information/data stored and/or encoded by the quantum state of neighboring atomic objects within the confinement apparatus. For example, crosstalk during a reading and/or detecting function may decohere a neighboring atomic object. Various embodiments provide decreased crosstalk reading and/or detection functions that preserve the quantum information/data stored by neighboring atomic objects during the reading and/or detection function. Various embodiments enable reading and/or detecting functions to be performed during the middle of the performance and/or execution of a quantum circuit (e.g., by a quantum computer) without disrupting the quantum information/data stored by the neighboring atomic objects during the performance of the reading and/or detection function.

Thus, various embodiments provide technical improvements to the fields of quantum computer operation (e.g., for a trapped ion quantum computer and/or the like) and to the field of reading and/or detecting atomic objects within an atomic object confinement apparatus in applications that are sensitive to crosstalk.

Exemplary Quantum Computer Comprising an Ion Trap Apparatus

As described above, a decreased crosstalk reading and/or detecting function is performed by a controller 30 of a quantum computer 910, in various embodiments. FIG. 9 provides a schematic diagram of an example quantum computer system 900 comprising a confinement apparatus 400 (e.g., an ion trap), in accordance with an example embodiment.

In various embodiments, the quantum computer system 900 comprises a computing entity 10 and a quantum computer 910. In various embodiments, the quantum computer 910 comprises a controller 30, a cryostat and/or vacuum chamber 40 enclosing a confinement apparatus 400, one or more manipulation sources 60, one or more voltage sources 50, one or more magnetic field generators 70 (e.g., 70A, 70B), an optics collection system 80, and/or the like. In various embodiments, the controller 30 is configured to control the operation of (e.g., control one or more drivers configured to cause operation of) the manipulation sources 60, voltage sources 50, magnetic field generators 70, a vacuum system and/or cryogenic cooling system (not shown), and/or the like. In various embodiments, the controller 30 is configured to receive signals (e.g., electrical signals) generated and provided by the optics collection system 80.

In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects 110 within the confinement apparatus 400. In an example embodiment, at least one of the one or more manipulation sources 60 is configured to generate and provide a reading beam 115. For example, in an example embodiment, wherein the one or more manipulation sources 60 comprise one or more lasers, the lasers may provide one or more laser beams to the confinement apparatus within the cryogenic and/or vacuum chamber 40 via beam paths 66 (e.g., 66A, 66B, 66C).

In various embodiments, the quantum computer 910 comprises one or more voltage sources 50. For example, the voltage sources may be arbitrary wave generators (AWG), and/or other voltage signal generators. For example, the voltage sources 50 may comprise a plurality of longitudinal voltage drivers and/or voltage sources and/or at least one RF driver and/or voltage source. The voltage sources 50 may be electrically coupled to the corresponding potential generating elements (e.g., longitudinal electrodes 416 and/or RF electrodes 412) of the confinement apparatus 400, in an example embodiment.

In various embodiments, the quantum computer 910 comprises one or more magnetic field generators 70 (e.g., 70A, 70B). For example, the magnetic field generator may be an internal magnetic field generator 70A disposed within the cryogenic and/or vacuum chamber 40 and/or an external magnetic field generator 70B disposed outside of the cryogenic and/or vacuum chamber 40. In various embodiments, the magnetic field generators 70 comprise permanent magnets, Helmholtz coils, electrical magnets, and/or the like. In various embodiments, the magnetic field generators 70 are configured to generate a magnetic field at one or more regions of the atomic object confinement apparatus 400 that has a particular magnitude and a particular magnetic field direction in the one or more regions of the atomic object confinement apparatus 400.

In various embodiments, the quantum computer 910 comprises an optics collection system 80 configured to collect and/or detect photons (e.g., stimulated emission 120) generated by qubits (e.g., during reading procedures). The optics collection system 80 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits (e.g., atomic objects) of the quantum computer 910. In various embodiments, the detectors may be in electronic communication with the quantum system controller 30 via one or more A/D converters 1025 (see FIG. 10) and/or the like.

In various embodiments, a computing entity 10 is configured to allow a user to provide input to the quantum computer 910 (e.g., via a user interface of the computing entity 10) and receive, view, and/or the like output from the quantum computer 910. The computing entity 10 may be in communication with the controller 30 of the quantum computer 910 via one or more wired or wireless networks 20 and/or via direct wired and/or wireless communications. In an example embodiment, the computing entity 10 may translate, configure, format, and/or the like information/data, quantum computing algorithms (e.g., quantum circuits), and/or the like into a computing language, executable instructions, command sets, and/or the like that the controller 30 can understand, execute, and/or implement.

In various embodiments, the controller 30 is configured to control the voltage sources 50, magnetic field generators 70, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40, configured to manipulate and/or cause a controlled evolution of quantum states of one or more atomic objects within the confinement apparatus, and/or read and/or detect a quantum (e.g., qubit) state of one or more atomic objects within the confinement apparatus. For example, the controller 30 may cause a controlled evolution of quantum states of one or more atomic objects within the confinement apparatus to execute a quantum circuit and/or algorithm. For example, the controller 30 may read and/or detect quantum states of one or more atomic objects within the confinement apparatus at one or more points during the execution of a quantum circuit. In various embodiments, the atomic objects confined within the confinement apparatus are used as qubits of the quantum computer 910.

Exemplary Controller

In various embodiments, a confinement apparatus 400 is incorporated into a quantum computer 910. In various embodiments, a quantum computer 910 further comprises a controller 30 configured to control various elements of the quantum computer 910. For example, the controller 30 may be configured to control the voltage sources 50, a cryogenic system and/or vacuum system controlling the temperature and pressure within the cryogenic and/or vacuum chamber 40, manipulation sources 60, magnetic field generators 70, and/or other systems controlling the environmental conditions (e.g., temperature, humidity, pressure, and/or the like) within the cryogenic and/or vacuum chamber 40, configured to manipulate and/or cause a controlled evolution of quantum states of one or more atomic objects within the confinement apparatus, and/or read and/or detect a quantum state of one or more atomic objects within the confinement apparatus.

As shown in FIG. 10, in various embodiments, the controller 30 may comprise various controller elements including processing elements 1005, memory 1010, driver controller elements 1015, a communication interface 1020, analog-digital converter elements 1025, and/or the like. For example, the processing elements 1005 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 1005 of the controller 30 comprises a clock and/or is in communication with a clock.

For example, the memory 1010 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 1010 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 1010 (e.g., by a processing element 1005) causes the controller 30 to perform one or more steps, operations, processes, procedures and/or the like described herein for controlling one or more components of the quantum computer 910 (e.g., voltages sources 50, manipulation sources 60, magnetic field generators 70, and/or the like) to cause a controlled evolution of quantum states of one or more atomic objects, detect and/or read the quantum state of one or more atomic objects, and/or the like.

In various embodiments, the driver controller elements 1015 may include one or more drivers and/or controller elements each configured to control one or more drivers. In various embodiments, the driver controller elements 1015 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 1005). In various embodiments, the driver controller elements 1015 may enable the controller 30 to operate a manipulation source 60. In various embodiments, the drivers may be laser drivers; vacuum component drivers; drivers for controlling the flow of current and/or voltage applied to longitudinal, RF, and/or other electrodes used for maintaining and/or controlling the confinement potential of the confinement apparatus (and/or other driver for providing driver action sequences and/or control signals to potential generating elements of the confinement apparatus); cryogenic and/or vacuum system component drivers; and/or the like. For example, the drivers may control and/or comprise longitudinal and/or RF voltage drivers and/or voltage sources that provide voltages and/or electrical signals to the longitudinal electrodes 416 and/or RF electrodes 412. In various embodiments, the controller 30 comprises means for communicating and/or receiving signals from one or more detectors 125 such as optical receiver components (e.g., cameras, MEMs cameras, CCD cameras, photodiodes, photomultiplier tubes, and/or the like). For example, the controller 30 may comprise one or more analog-digital converter elements 1025 configured to receive signals from one or more detectors 125, optical receiver components, calibration sensors, and/or the like.

In various embodiments, the controller 30 may comprise a communication interface 1020 for interfacing and/or communicating with a computing entity 10. For example, the controller 30 may comprise a communication interface 1020 for receiving executable instructions, command sets, and/or the like from the computing entity 10 and providing output received from the quantum computer 910 (e.g., from an optical collection system comprising one or more detectors 125) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 11 provides an illustrative schematic representative of an example computing entity 10 that can be used in conjunction with embodiments of the present invention. In various embodiments, a computing entity 10 is configured to allow a user to provide input to the quantum computer 910 (e.g., via a user interface of the computing entity 10) and receive, display, analyze, and/or the like output from the quantum computer 910.

As shown in FIG. 11, a computing entity 10 can include an antenna 1112, a transmitter 1104 (e.g., radio), a receiver 1106 (e.g., radio), and a processing element 1108 that provides signals to and receives signals from the transmitter 1104 and receiver 1106, respectively. The signals provided to and received from the transmitter 1104 and the receiver 1106, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 1116 and/or speaker/speaker driver coupled to a processing element 1108 and a touch screen, keyboard, mouse, and/or microphone coupled to a processing element 1108). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 1118 (hard or soft), a touch display, voice/speech or motion interfaces, scanners, readers, or other input device. In embodiments including a keypad 1118, the keypad 1118 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1122 and/or non-volatile storage or memory 1124, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
providing at least two atomic objects within a confinement apparatus, the at least two atomic objects comprising an atomic object being read and at least one neighboring atomic object, the confinement apparatus comprises (a) one or more radio frequency (RF) electrodes defining an RF null axis of the atomic object confinement apparatus and (b) a plurality of longitudinal electrodes;
causing at least one first control signal to be provided to at least one longitudinal electrode of the plurality of longitudinal electrodes, wherein the at least one first control signal causes the at least one longitudinal electrode to generate a push field configured to cause one of (a) the at least one neighboring atomic object to move in a direction transverse to the RF null axis at a location of the at least one neighboring atomic object or (b) the atomic object being read to move in a direction transverse to the RF null axis at a location of the atomic object being read; and
causing a manipulation source to generate and provide a reading beam that is incident at least in part on the atomic object being read.

2. The method of claim 1, further comprising:
beginning to execute a quantum circuit using the at least two atomic objects within the atomic object confinement apparatus;
during the performance of the quantum circuit, identifying a read function to be performed, wherein the causing of the at least one first control signal to be provided to the at least one longitudinal electrode and the causing of the manipulation source to generate and provide the reading beam are performed responsive to identifying the read function to be performed; and
continuing to execute the quantum circuit.

3. The method of claim 2, further comprising:
receiving a read result responsive to the reading beam being incident at least in part on the atomic object being read; and
adjusting the quantum circuit based at least in part on the read result such that the adjusted quantum circuit is executed.

4. The method of claim 1, further comprising:
causing at least one second control signal to be provided to one or more longitudinal electrodes of the plurality of longitudinal electrodes, wherein the at least one second control signal causes the one or more longitudinal electrodes to generate an oscillating potential configured to cause the at least one neighboring atomic object to oscillate in a direction substantially parallel to a direction between the at least one neighboring atomic object and the atomic object being read.

5. The method of claim 4, wherein a magnetic field experienced by the at least one neighboring atomic object has a magnetic field direction that is transverse to a gradient of the oscillating potential.

6. The method of claim 1, wherein the at least one first control signal is configured to cause the push field to increase monotonically to a maximum field strength and then decrease monotonically to a minimum field strength.

7. The method of claim 6, wherein the maximum field strength is in a range of 1050 to 1250 Volts per meter.

8. The method of claim 6, wherein as the field strength decreases from the maximum field strength to the minimum field strength, the at least one neighboring atomic object moves toward the RF null axis.

9. The method of claim 1, wherein when the one of (a) the at least one neighboring atomic object or (b) the atomic object being read is located off of the RF null axis, the one of (a) the at least one neighboring atomic object or (b) the atomic object being read exhibits oscillations in a direction transverse to the RF null axis at the location of the at least one neighboring atomic object.

10. The method of claim 1, wherein when the atomic object being read is located off of the RF null axis, a frequency of the reading beam is modulated so that in an oscillating reference frame of the atomic object being read, the frequency of the reading beam is on resonance for a particular transition of the atomic object being read.

11. The method of claim 1, wherein, in a reference frame of the at least one neighboring atomic object, a frequency of the reading beam is off resonant with a particular transition of the at least one neighboring atomic object.

12. A controller operatively connected to one or more components of a system comprising a confinement apparatus, the confinement apparatus comprising (a) one or more radio frequency (RF) electrodes defining an RF null axis of the atomic object confinement apparatus and (b) a plurality of longitudinal electrodes and the one or more components comprising (a) voltage sources and (b) manipulation sources, the controller configured to:
cause at least two atomic objects to be confined within the confinement apparatus, the at least two atomic objects comprising an atomic object being read and at least one neighboring atomic object;
cause the voltage sources to provide at least one first control signal to at least one longitudinal electrode of the plurality of longitudinal electrodes, wherein the at least one first control signal causes the at least one longitudinal electrode to generate a push field configured to cause one of (a) the at least one neighboring atomic object to move in a direction transverse to the RF null axis at a location of the at least one neighboring atomic object or (b) the atomic object being read to move in a direction transverse to the RF null axis at a location of the atomic object being read; and
cause a manipulation source to generate and provide a reading beam that is incident at least in part on the atomic object being read.

13. The controller of claim 12, wherein the controller is further configured to:
control the one or more components to cause a quantum circuit to begin to be performed using the at least two atomic objects within the atomic object confinement apparatus; and
during the performance of the quantum circuit, identify a read function to be performed, wherein the causing of the voltage sources to provide the at least one first control signal to the at least one longitudinal electrode and the causing of the manipulation source to generate and provide the reading beam are performed responsive to identifying the read function to be performed; and
control the one or more components to cause the quantum circuit to continue to be performed.

14. The controller of claim 13, wherein the controller is further configured to:
receive a read result responsive to the reading beam being incident at least in part on the atomic object being read;
adjust the quantum circuit based at least in part on the read result such that the adjusted quantum circuit is executed.

15. The controller of claim 11, wherein the controller is further configured to:
cause the voltage sources to provide at least one second control signal to one or more longitudinal electrodes of the plurality of longitudinal electrodes, wherein the at least one second control signal causes the one or more longitudinal electrodes to generate an oscillating potential configured to cause the at least one neighboring atomic object to oscillate in a direction substantially parallel to a direction between the at least one neighboring atomic object and the atomic object being read.

16. The controller of claim 12, wherein the at least one first control signal is configured to cause the push field to increase monotonically to a maximum field strength and then decrease monotonically to a minimum field strength.

17. The controller of claim 16, wherein as the field strength decreases from the maximum field strength to the minimum field strength, the at least one neighboring atomic object moves toward the RF null axis.

18. The controller of claim 12, wherein when the one of (a) the at least one neighboring atomic object or (b) the atomic object being read is located off of the RF null axis, the one of (a) the at least one neighboring atomic object or (b) the atomic object being read exhibits oscillations in a direction transverse to the RF null axis.

19. The controller of claim 12, wherein when the atomic object being read is located off of the RF null axis, the controller causes the manipulation source to modulate a frequency of the reading beam so that in an oscillating reference frame of the atomic object being read, the frequency of the reading beam is on resonance for a particular transition of the atomic object being read.

20. The controller of claim 12, wherein, in a reference frame of the at least one neighboring atomic object, a frequency of the reading beam is off resonant with a particular transition of the at least one neighboring atomic object.

* * * * *

UNITED STATES PATENT AND TRADEMARK OFFICE
CERTIFICATE OF CORRECTION

Page 1 of 1

PATENT NO. : 11,972,322 B2
APPLICATION NO. : 17/393011
DATED : April 30, 2024
INVENTOR(S) : John Gaebler et al.

It is certified that error appears in the above-identified patent and that said Letters Patent is hereby corrected as shown below:

In the Claims

In Column 30, Line 27, Claim 15, delete "11," and insert -- 12, --, therefor.

Signed and Sealed this
Fifth Day of August, 2025

Coke Morgan Stewart
*Acting Director of the United States Patent and Trademark Office*